United States Patent
Ciesielski et al.

(10) Patent No.: US 11,634,560 B2
(45) Date of Patent: Apr. 25, 2023

(54) EFFICIENT PHOSPHOROUS STABILIZERS BASED ON DIPHENYLAMINE AND HETEROCYCLIC DIPHENYLAMINE DERIVATIVES

(71) Applicant: FRAUNHOFER-GESELLSCHAFT ZUR FÖRDERUNG DER ANGEWANDTEN FORSCHUNG E.V., Munich (DE)

(72) Inventors: Michael Ciesielski, Merseburg (DE); Max Briesenick, Saarbrücken (DE); Rudolf Pfaendner, Rimbach (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 702 days.

(21) Appl. No.: 16/488,902

(22) PCT Filed: Feb. 14, 2018

(86) PCT No.: PCT/EP2018/053670
§ 371 (c)(1),
(2) Date: Aug. 26, 2019

(87) PCT Pub. No.: WO2018/153747
PCT Pub. Date: Aug. 30, 2018

(65) Prior Publication Data
US 2021/0130582 A1    May 6, 2021

(30) Foreign Application Priority Data

Feb. 27, 2017   (DE) .................. 102017203164.6

(51) Int. Cl.
| | | |
|---|---|---|
| C08K 5/5399 | (2006.01) | |
| C07F 9/50 | (2006.01) | |
| C07F 9/535 | (2006.01) | |
| C07F 9/6547 | (2006.01) | |
| C07F 9/6571 | (2006.01) | |
| C07F 9/6584 | (2006.01) | |
| C09K 15/18 | (2006.01) | |
| C09K 15/20 | (2006.01) | |
| C09K 15/26 | (2006.01) | |
| C09K 15/28 | (2006.01) | |
| C09K 15/30 | (2006.01) | |

(52) U.S. Cl.
CPC .......... *C08K 5/5399* (2013.01); *C07F 9/5022* (2013.01); *C07F 9/535* (2013.01); *C07F 9/6547* (2013.01); *C07F 9/65719* (2013.01); *C07F 9/65846* (2013.01); *C07F 9/657163* (2013.01); *C09K 15/18* (2013.01); *C09K 15/20* (2013.01); *C09K 15/26* (2013.01); *C09K 15/28* (2013.01); *C09K 15/30* (2013.01)

(58) Field of Classification Search
None
See application file for complete search history.

(56) References Cited

U.S. PATENT DOCUMENTS

| | | | |
|---|---|---|---|
| 4,661,594 A | 4/1987 | Rasberger et al. | |
| 5,230,816 A | 7/1993 | Pastor et al. | |
| 5,670,642 A | 9/1997 | Pitteloud | |
| 6,869,992 B2 | 3/2005 | Gugumus | |
| 2003/0069337 A1 | 4/2003 | Gugumus | |

FOREIGN PATENT DOCUMENTS

| | | | | |
|---|---|---|---|---|
| CN | 1404501 A | 3/2003 | | |
| CN | 101 531 578 A | 9/2009 | | |
| CN | 102 237 551 A | 11/2011 | | |
| CN | 104 212 439 A | 12/2014 | | |
| CN | 105 859 778 A | 8/2016 | | |
| DE | 2417991 A1 | 10/1975 | | |
| DE | 146464 A | * | 2/1981 | ............... C08K 5/49 |
| GB | 874331 A | 8/1961 | | |
| JP | S46-3811 A | 11/1971 | | |
| JP | S46-003811 A | 11/1971 | | |
| JP | S50-003150 A | 1/1975 | | |
| JP | S50-006019 B | 3/1975 | | |
| JP | H06-184175 A | 7/1994 | | |
| JP | H08-239393 A | 9/1996 | | |
| JP | 2006-328100 A | 12/2006 | | |
| JP | S45-035667 B | 9/2010 | | |
| JP | 2011-032390 A | 2/2011 | | |
| KR | 10 2014 0 128 890 A | 11/2014 | | |

(Continued)

OTHER PUBLICATIONS

Cole et al., "Phosphorus Compounds as Ovicides and Adulticides against Body Lice," *Journal of Economic Entomology* 49(6): 747-750 (1956).
Database CA [Online] Chemical Abstracts Service, Columbus, Ohio, US; Apr. 22, 2001 (Apr. 22, 2001), Cole, M. M. et al: "Phosphorus compounds as ovicides and adulticides against body lice," XP002780232, retrieved from STN Database accession No. 1957:31513.
Yehia et al., "Evaluation of amino-phosphine compounds as antioxidants and antifatigue agents in NR and SBR vulcanizates," *Polymer-Plastics Technology and Engineering* 41(2): 199-213 (2002).
REGISTRY excerpts for RN 1640119-08-9 and RN 1640119-07-8 (1 pg) 2017.
German Patent Office, Office Action in German Patent Application No. 10 2017 203 164.6 (May 19, 2017).
Japan Patent Office, Notice of Reasons for Refusal in Japanese Patent Application No. 2019-546276 (dated Nov. 10, 2020).

(Continued)

*Primary Examiner* — Joseph R Kosack
(74) *Attorney, Agent, or Firm* — Leydig, Voit & Mayer, Ltd.

(57) ABSTRACT

The present invention relates to the use of efficient phosphorous substances, in particular based on diphenylamine and heterocyclic diphenylamine derivatives as stabilizers for organic materials, in particular for plastic materials, against oxidative, thermal and/or actinic degradation. The present invention additionally relates to an organic material that has been correspondingly stabilized as described above. The invention further relates to a method of stabilizing organic materials and to specific stabilizers.

7 Claims, No Drawings

(56) References Cited

FOREIGN PATENT DOCUMENTS

| KR | 10 2014 0 128 891 A | 11/2014 |
|----|----|----|
| SU | 666187 A1 | 6/1979 |
| WO | WO 2015/158689 A1 | 10/2015 |
| WO | WO 2015/158692 A1 | 10/2015 |

OTHER PUBLICATIONS

European Patent Office, International Search Report in International Application No. PCT/EP2018/053670 (dated May 7, 2018).
European Patent Office, Written Opinion in International Application No. PCT/EP2018/053670 (dated May 7, 2018).
International Bureau of WIPO, International Preliminary Report on Patentability in International Application No. PCT/EP2018/053670 (dated Aug. 27, 2019).
Intellectual Property India, Office Action in Indian Patent Application No. 201917038728 (dated Mar. 19, 2021).
European Patent Office, Notification under Article 94(3) EPC in European Patent Application No. 18 705 885.4 (dated Aug. 23, 2021).
Korean Intellectual Property Office, Examination Report in Korean Patent Application No. 10-2019-7026229 (dated Oct. 29, 2021).
China National Intellectual Property Adminstration, First Office Action in Chinese Patent Application No. 201880014166.5 (dated Dec. 25, 2020).
Korean Intellectual Property Office, Notice of Final Rejection in Korean Patent Application No. 10-2019-7026229 (dated Oct. 26, 2022).
Korean Intellectual Property Office, Decision on Dismissal of Amendment in Korean Patent Application No. 10-2019-7026229 (dated Oct. 26, 2022).

* cited by examiner

EFFICIENT PHOSPHOROUS STABILIZERS BASED ON DIPHENYLAMINE AND HETEROCYCLIC DIPHENYLAMINE DERIVATIVES

CROSS-REFERENCE TO RELATED APPLICATIONS

This patent application is the U.S. national phase of International Application No. PCT/EP2018/053670, filed on Feb. 14, 2018, which claims the benefit of German Patent Application No. 102017203164.6, filed Feb. 27, 2017, the disclosures of which are incorporated herein by reference in their entireties for all purposes.

BRIEF SUMMARY OF THE INVENTION

The present invention relates to the use of efficient phosphorous substances, in particular based on diphenylamine and heterocyclic diphenylamine derivatives as stabilizers for organic materials, in particular for plastic materials, against oxidative, thermal and/or actinic degradation. The present invention additionally relates to an organic material that has been correspondingly stabilized as described above. The invention further relates to a method of stabilizing organic materials and to specific stabilizers.

DETAILED DESCRIPTION OF THE INVENTION

Plastics and plastic-based compositions such as coatings are subject to autoxidation in processing and in use. Starting from radical chain scissions due to mechanochemical processes or due to UV radiation in the presence of oxygen, said autoxidation results in changes to the polymer chain such as in the molecular weight or in the formation of new chemical groups.

The scission or chemical change of polymer molecules degrades the mechanical properties of the plastics and results in color changes (yellowing) or in other unwanted effects. The thermal degradation limits the maximum working temperature of plastics and aging processes restrict the possible duration of use of plastic articles that is shorted as the temperature increases. The addition of specific stabilizers such as antioxidants and light stabilizers is therefore necessary that retard the degradation processes and thus have a substantial influence on the processing capability and on the area of use of plastics.

There is currently great interest in more powerful stabilizers or stabilizer systems, inter alia because plastics are increasingly being used in application areas in which they are exposed to elevated thermal and/or mechanical strains (electromobility, lightweight constructions, high performance batteries, etc.). A further reason to look for new stabilizers comprises the fact that a large number of currently used substances do not satisfy all the demands, e.g. with respect to their compatibility with the polymers to be protected, to low migration, or to the formation of unwanted degradation products.

There are different kinds of stabilizers of which the following are inter alia significant:
  processing stabilizers slow down the degradation processes that occur at high processing temperatures;
  long-term thermostabilizers are used to retard aging, in particular at elevated temperatures;
  high temperature stabilizers counteract degradation when plastics are exposed to high temperatures (180° C. and more); and
  UV stabilizers retard or prevent the degradation processes initiated by UV light.

The different stabilizers are used as (synergetic) combinations in a number of cases. The object of stabilizers is inter alia to intercept free radicals produced therein and to deactivate the peroxides and hydroperoxides arising under the effect of oxygen since they cause damage to the polymer chain. The efficacy of the stabilizers or antioxidants is of great important both for the processing capability of the plastics and for the service life of the articles produced from them. They also influence the maximum temperature of use of the plastics or their possible duration of use at elevated temperatures.

A large number of chemical compounds are available as stabilizers/antioxidants on the market. The most important classes of antioxidants are sterically hindered phenols, phosphites or phosphonites, amines, thiol compounds, hydroxylamines, and lactones. In particular sterically hindered amines, so-called HALS compounds, can be named as light stabilizers that are simultaneously used as long-term heat stabilizers. Furthermore, benzotriazoles, benzophenones, hydroxyphenyl triazines, and others are furthermore frequently used as UV absorbers.

The particular importance of the phosphite stabilizers results from their ability to deactivate peroxides and hydroperoxides. The previously used substances have disadvantages, however, inter alia with respect to their thermostability, long term efficacy, hydrolysis resistance, and compatibility, so that there is an intense search for new, better stabilizers that should inter alia have the following advantages:
  increased hydrolysis resistance and improved thermal properties;
  usable at particularly high temperatures;
  particularly high and long-lasting efficiency; and
  no unwanted side effects (discoloration, etc.).

Derivatives of the diphenylamine are used as environmentally friendly, less toxic stabilizers for elastomers. The structurally similar heterocyclic compound phenothiazine likewise has a great ability to deactivate radicals and is only slightly toxic. It is used for the storage stabilization of acrylates, methacrylates, and other monomers, with their spontaneous polymerization being prevented by an interception of radicals, that is, it acts in a similar manner to plastic stabilizers. Phenothiazine is furthermore an effective antioxidant for lubricants. A patent from 1961 (GB 874,331, "Improved polyethylene compositions") includes the use of phenothiazine as a stabilizer for polyethylene. Phenothiazine, however, despite the demonstrated stabilizing effect of thermoplastics and elastomers, has the disadvantage of high volatility under typical processing conditions and thereby has no commercial importance as a plastic stabilizer.

Only very few phosphorous phenothiazine derivatives have been described or listed in patents to date. Phenothiazine derivatives that carry phosphorous substitutes at the nitrogen atom are mentioned in the following patents: WO2015158692A1 (2016), WO2015158689A1 (2016), CN 101531578A (2009).

The following compound is mentioned as a flameproofing agent for plastics in the patent JP2006328100A (Songwon Industrial Co. LTD, 2006):

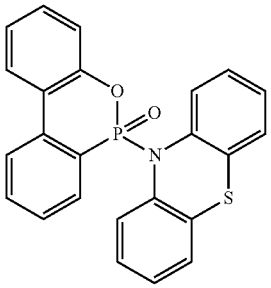 [SMILES: O=P1(N2c3ccccc3Sc3ccccc32)Oc2ccccc2-c2ccccc21]

To date, however, nothing was known with respect to an effect of this compound and of other phosphorous derivatives of the phenothiazine for antioxidative stabilization.

A large number of phosphorous derivatives of structurally related carbazole have been described and various application options of such substances are listed in patent literature, but not as stabilizers for plastics.

Nothing is known of a use or a testing as a stabilizer for plastics with respect to phosphorous diphenylamine derivatives that carry at least one carbon atom at the phosphorous atom.

It was the object of the present invention to develop new effective stabilizers for plastics and plastic-based uses.

This object is achieved by the features of the specific materials used as stabilizers as described herein; by the features of the specifically stabilized organic material described herein; by the features of the method of stabilizing organic materials described herein; and by the features of the specific stabilizers also described herein, and the advantageous further developments thereof.

The present invention thus relates to the use of a compound or of mixtures of a plurality of compounds in accordance with the general formula I $$A\text{-}B_y \quad \text{Formula I}$$

where
fragment A has the following meaning

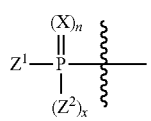

where respectively independently of one another
X is a sulfur atom;
n is 0 or 1;
x is 0 or 1;
and $Z^1$ and $Z^2$ are selected from the group comprising hydrogen, alkyl residues, aryl residues, alkyl aryl residue, aryl alkyl residues, heterocyclic residues, with one or more further fragments A and/or B being able to be bound to the previously named residues;
and a grouping —O—$Z^3$, where $Z^3$ is selected from alkyl residues, aryl residues, alkyl aryl residues, aryl alkyl residues, and heterocyclic residues;
and a grouping —S—$Z^4$, where $Z^4$ is selected from alkyl residues, aryl residues, alkyl aryl residues, aryl alkyl residues, and heterocyclic residues, wherein in the case of x=1, the residues $Z^1$ and $Z^2$ together with the phosphorous atom can form a ring system to which one or more further fragments A and/or B can be bound;

the fragment B has the following meaning

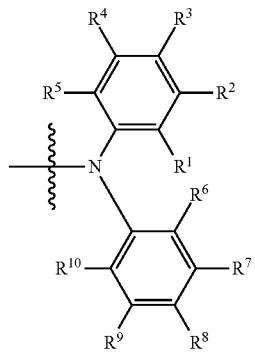

$R^1$ to $R^{10}$ are selected, respectively independently of one another, from the group comprising hydrogen, alkyl residues, aryl residues, alky aryl residues, aryl alkyl residues, and heterocyclic residues, wherein (in the case y=1 or 2), preferably in the case y=1, the residues $R^1$ and $R^6$ can also be linked via a grouping —Y— linking the phenyl groups, where Y is selected from the group comprising S, O, NH, PH, and a covalent bond;

wherein the fragments A and B are connected to one another by covalent bonding of the phosphorous atom and the nitrogen atom;

and wherein
y is 1 or 2,
where x+y=2 applies
for stabilizing organic materials, in particular against oxidative, thermal and/or actinic degradation.

The compound in accordance with the general formula I can here be present as a separate molecule, but equally also be present bonded at a polymer backbone, either within the main chain or within a secondary chain.

$Z^1$ and $Z^2$ are preferably selected from the group comprising hydrogen, alkyl residues, aryl residues, alkyl aryl residues, aryl alkyl residues, heterocyclic residues, with one or more further fragments A and/or B being able to be bound to the previously named residues;

and a grouping —O—$Z^3$, where $Z^3$ is selected from alkyl residues, aryl residues, alkyl aryl residues, aryl alkyl residues, and heterocyclic residues;

wherein in the case of x=1, the residues $Z^1$ and $Z^2$ together with the phosphorous atom can form a ring system to which one or more further fragments A and/or B can be bound.

It was surprisingly able to be found that the compounds in accordance with the general formula I as defined above have a particularly good efficiency as stabilizers of organic materials so that their use already produces high stabilization rates in a relatively low concentration.

The above-described compounds are in particular suitable for stabilizing plastics, coatings, lubricant films, hydraulic oils, chemicals, and monomers.

In the above-described compounds in accordance with formula I, it is in particular preferred if fragment A is selected from the following residues

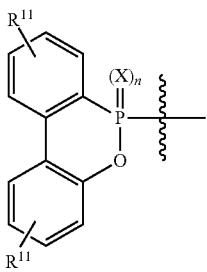

where x=y=1 applies

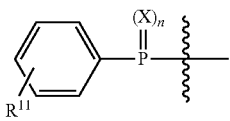

where x=0 and y=2 applies, or

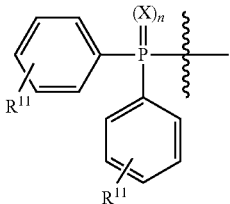

where x=y=1 applies

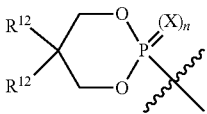

where x=y=1 applies
  where respectively independently of one another
  $R^{11}$ is selected from the group comprising hydrogen, alkyl residues, aryl residues, alkyl aryl residues, aryl alkyl residues, and heterocyclic residues;
  $R^{12}$ is selected from the group comprising hydrogen, alkyl residues, aryl residues, alkyl aryl residues, aryl alkyl residues, and heterocyclic residues, wherein the previously named residues can also comprise heteroatoms and/or can be bound to the previously named residues or to a plurality of further fragments A and/or B; and
  X and n are defined herein.

The fragment is particularly preferably selected from the following residues

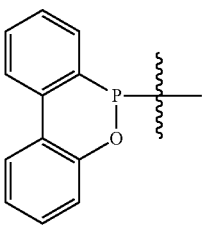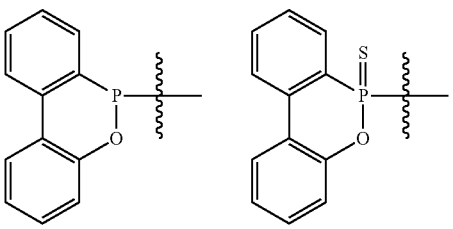

where x=y=1 applies in each case,

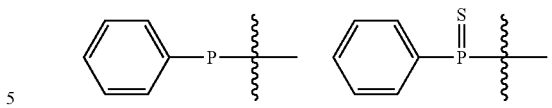

where x=0 and y=2 applies in each case, and

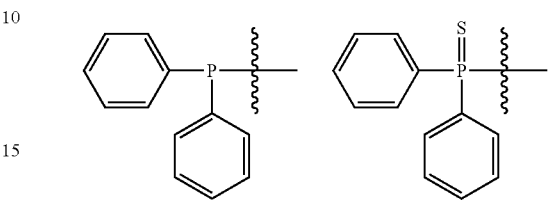

where x=y=1 applies in each case.

It is advantageous with respect to fragment B if it is selected from the group comprising the following residues

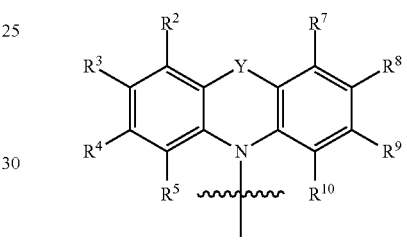

where y=1 or 2 applies,

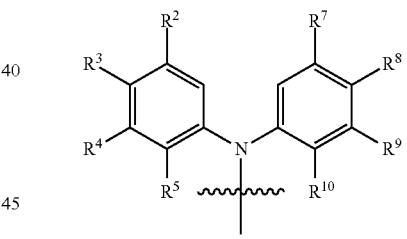

where y=1 or 2 applies, and

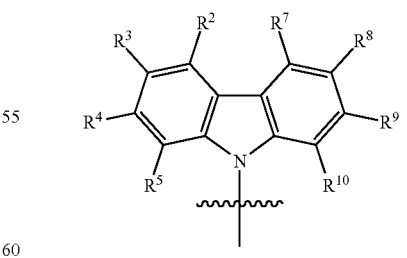

where y=1 or 2 applies,
  wherein, respectively independently of one another, $R^2$ to $R^5$ and $R^7$ to $R^{10}$ and Y are defined herein.

It is particularly preferred here if the fragment B is selected from the group comprising the following residues.

Particularly preferred compounds that can be used as stabilizers for the purposes of the present invention are listed in the following:
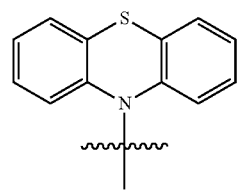
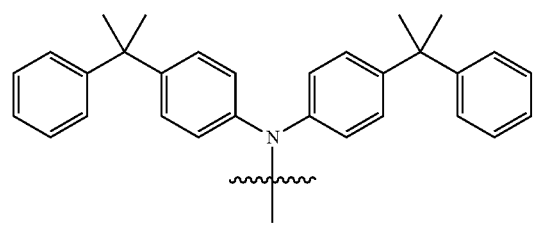
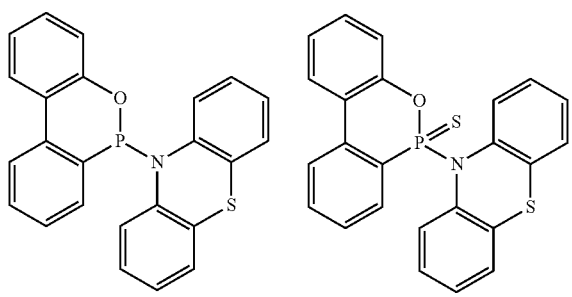
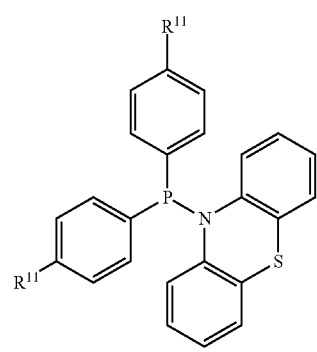
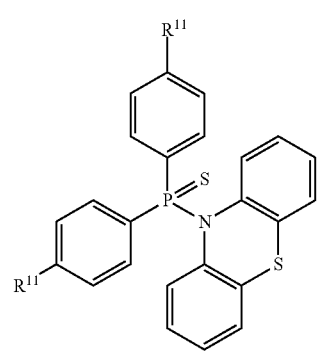
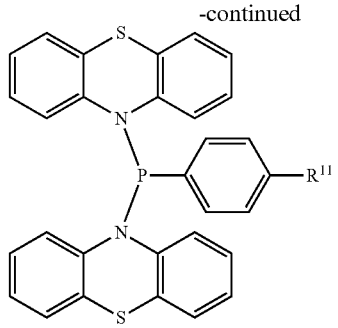
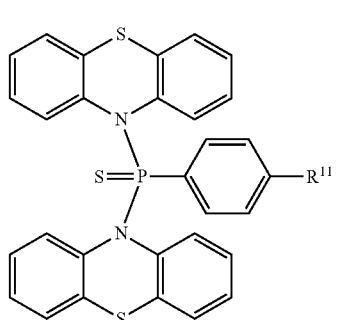
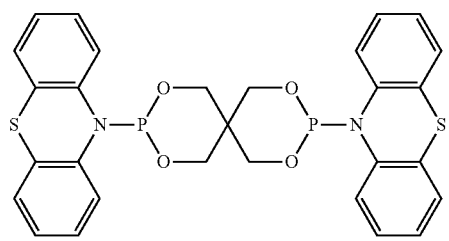
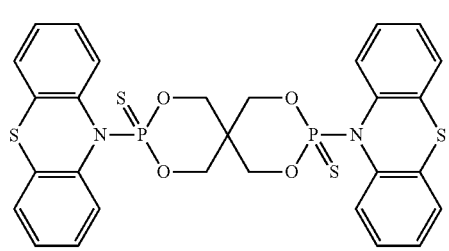
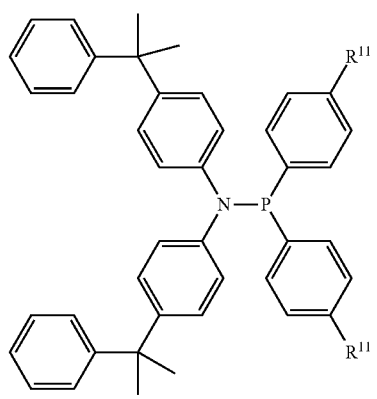

-continued
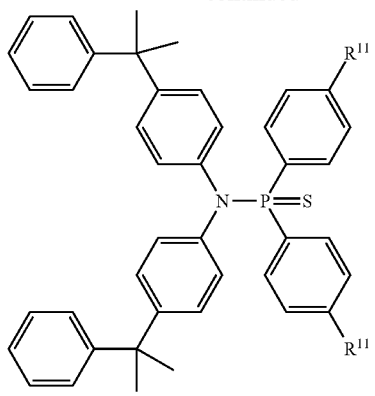
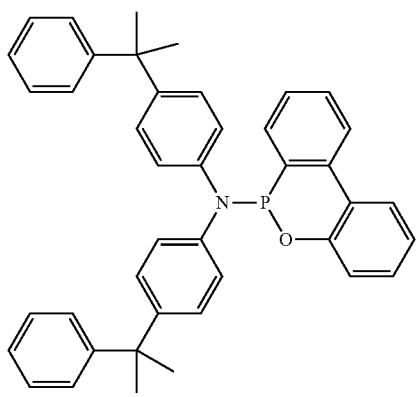
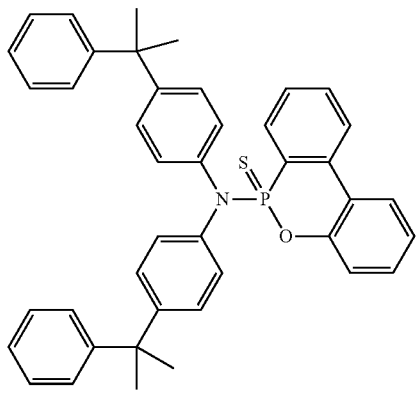
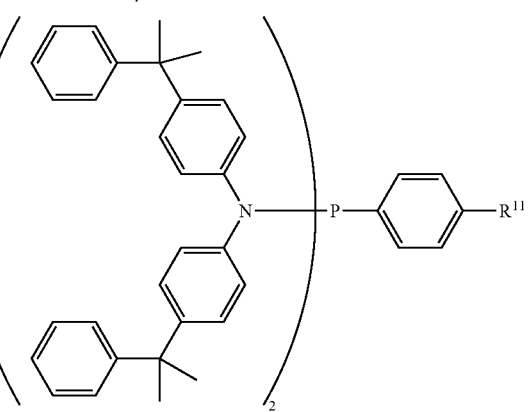
-continued
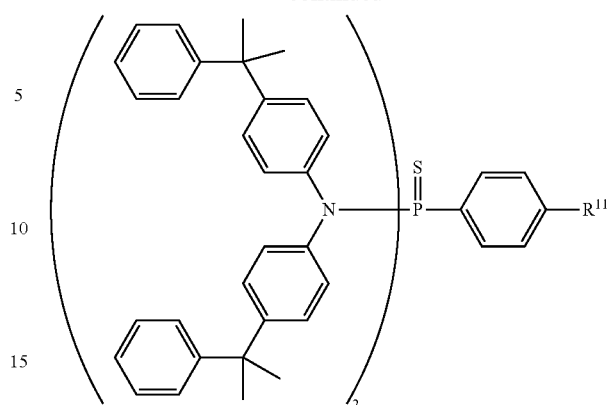
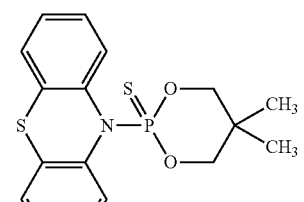
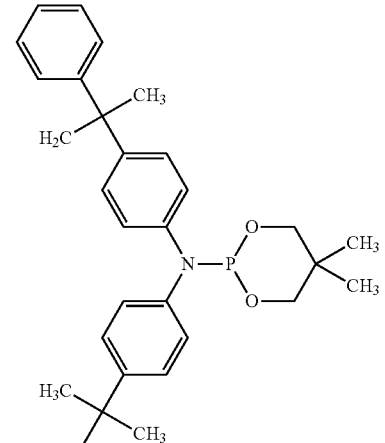
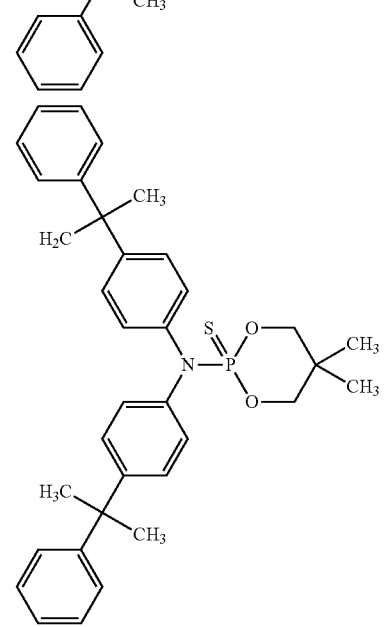

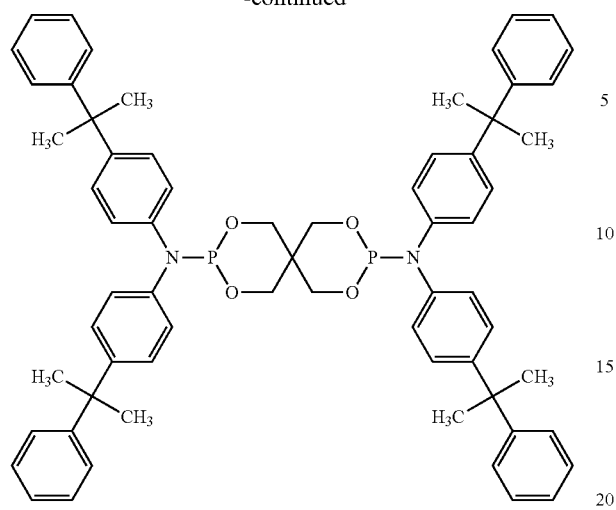
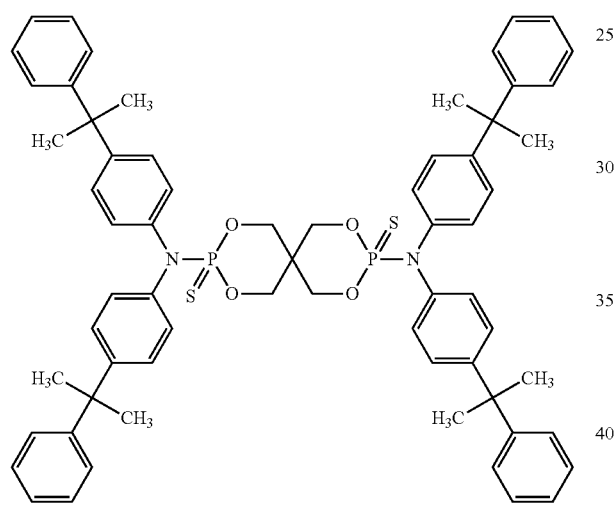
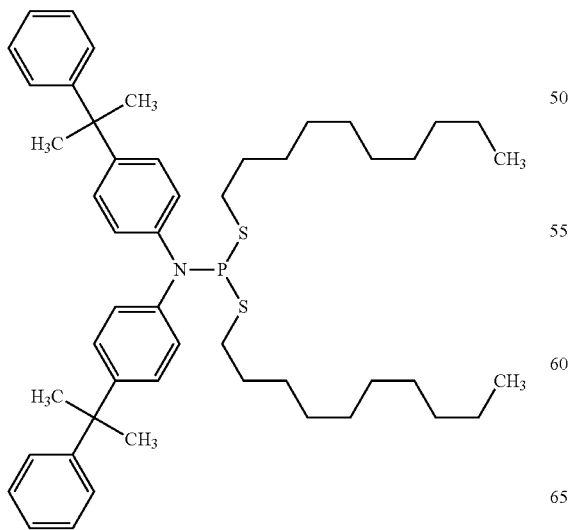
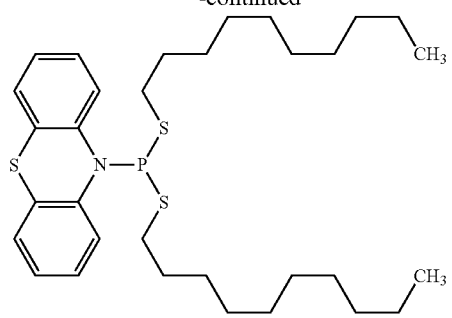
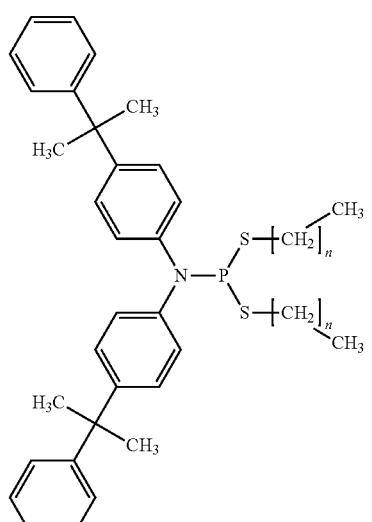
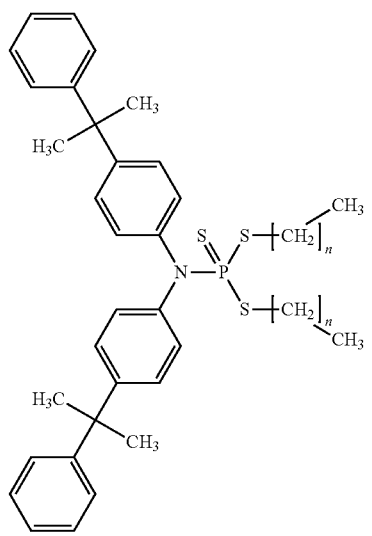

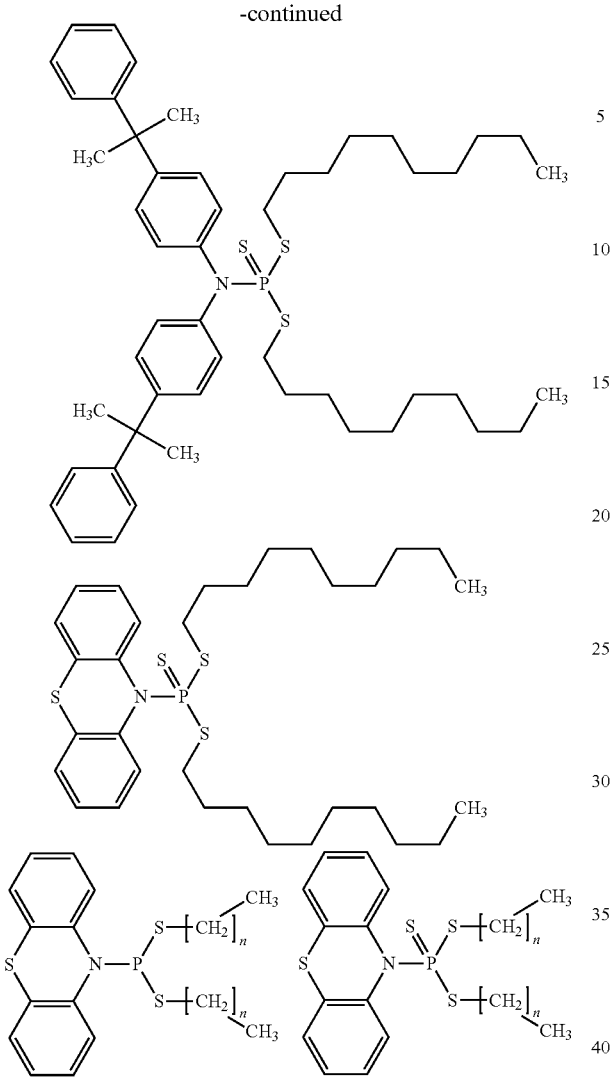

wherein respectively independently of one another

R[11] is selected from the group comprising hydrogen, alkyl residues, aryl residues, alkyl aryl residues, aryl alkyl residues, and heterocyclic residues.

Due to a low efficiency, a compound in accordance with the following formula

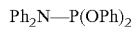

is in particular preferably precluded from the use in accordance with the present invention:

The compound in accordance with the general formula I or in the case of a mixture of plurality of compounds in accordance with the general formula I the totality of all the compounds in accordance with the general formula I, is added (incorporated) and/or worked in by mixing, preferably at a weight proportion from 0.01 to 10 wt. %, preferably from 0.05 to 5 wt. %, particularly preferably from 0.1 to 1.5 wt. %, in the organic material, i.e. the material that is subjected to an oxidative, thermal and/or actinic degradation. This can take place, for example, on the thermal processing by melting such as by kneading or extrusion of the materials, in particular in the case of plastic compounds. With liquid materials such as oils, the working in of the compounds in accordance with the general formula I takes place by dissolving or dispersing the materials in the liquids.

In the event that the compound in accordance with the general formula I is used for stabilizing plastic materials, it is preferred if the plastic is selected from the group comprising a) polymers of olefins or diolefins such as polyethylene (LDPE, LLDPE, VLDPE, ULDPE, MDPE, HDPE, UHMWPE), metallocene-PE (m-PE), polypropylene, polyisobutylene, poly-4-methyl-pentene-1, polybutadiene, polyisoprene such as e.g. also natural rubber (NR), polycyclooctene, polyalkylene carbon monoxide copolymers, and copolymers in the form of static structures or block structures such as polypropylene polyethylene (EP), EPM or EPDM with e.g. 5-ethylidene-2-norbornes as comonomers, ethylene vinylacetate (EVA), ethylene acrylic esters such as ethylene butylacrylate, ethylene acrylic acid and their salts (ionomers), and terpolymers such as ethylene acylic acid glycidyl (meth)acrylate, graft polymers such as polypropylene graft maleic acid anhydride, polypropylene graft acrylic acid, polyethylene graft acrylic acid, polyethylene polybutylacrylate graft maleic acid anhydride, and blends such as LDPE/LLDPE or also long chain branched polypropylene copolymers prepared with alpha olefins as comonomers such as 1-butene, 1-hexene, 1-octene, or 1-octadene b) polystyrene, polymethylstyrene, poly-alpha-methylstyrene, polyvinyl naphthalene, polyvinyl biphenyl, polyvinyl toluol, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile (SAN), styrene acrylonitrile acrylate (ASA), styrene ethylene, styrene maleic acid anhydride polymers, incl. corresponding graft copolymers such as styrene on butadiene, maleic acid anhydride on SBS or SEBS, and graft copolymers of methylmethacrylate, styrene butadiene, and ABS (MABS), and hydrated polystyrene derivatives such as polyvinyl cyclohexane c) halogen-containing polymers such as polyvinyl chloride (PVC), polychloroprene and polyvinylidene chloride (PVDC), copolymers of vinyl chloride and vinylidene chloride or composed of vinyl chloride and vinyl acetate, chlorinated polyethylene, polyvinylidene fluoride, epichlorohydrin homopolymers and copolymers, in particular with ethylene oxide (ECO)

d) polymers of unsaturated esters such as polyacrylates and polymethacrylates such as polymethyl methacrylate (PMMA), polybutyl acrylate, polylauryl acrylate, poly stearyl acrylate, polyglycidyl methacrylate, polyacrylonitrile, polyacrylamides, copolymers such as polyacrylonitrile-poly alkyl acrylate, e) polymers of unsaturated alcohols and derivatives such as polyvinyl alcohol, polyvinyl acetate, polyvinyl butyral, poly allyl pththalate, poly allyl melamine f) polyacetates such as polyoxymethylene (POM) or copolymers with e.g. butanal, g) polyphenylene oxides and blends with polystyrene or polyamides, h) polymers of cyclic ethers such as polyethylene glycol, polypropylene glycol, polyethylene oxide, polypropylene oxide, polytetrahydrofuran, i) polyurethanes of hydroxy terminated polyethers or polyesters and aromatic or aliphatic isocyanates such as 2,4- or 2,5-toluylene diisocyanate or methylene diphenyl diisocyanate, in particular also linear polyurethanes/TPU), polyureas, j) polyamides such as polyamide-6, 6.6, 6.10, 4.6, 4.10, 6.12, 10.10, 10.12, 12.12, polyamide 11, polyamide 12, and (part) aromatic polyamides such as poly phthalamides, e.g. prepared from terepththalic acid and/or isophthalic acid and aliphatic diamines such as hexamethylene diamine or m-xylylene diamine or from aliphatic dicarboxylic acids such as adipic acid or sebacic acid and aromatic diamines such as 1,4- or 1,3-diaminobenzol, blends of different polyamides such as PA-6 and PA 6.6 or blends of polyamides and polyolefins such as PA/PP k) polyimides, polyamide imides, polyether imides, polyester imides, poly(ether)ketones, polysulfones, polyether sulfones, polyaryl sulfones, polyphenylene sulfides, polybenzimidazoles, polyhydantoines, l) polyesters of aliphatic or aromatic dicarboxylic acids and diols or of hydroxy carboxylic acids such as polyethylene terephthalate (PET), polybutylene terephthalate (PBT) polypropylene terephthalate (PTT), polyethylene naphthalate (PEN), poly-1,4-dimethylol cyclohexane terephthalate, polyhydroxy benzoate, polyhydroxy napththalate, poly lactic acid (PLA), polyhydroxy butyrate (PHB), polyhydroxy valerate (PHV), polyethylene succinate, polytetramethylene succinate, polycaprolactone m) polycarbonates, polyester carbonates, and blends such as PC/ABS, PC/PBT, PC/PET/PBT, PC/PA n) cellulose derivatives such as cellulose nitrate, cellulose acetate, cellulose propionate, cellulose butyrate, o) epoxy resins comprising difunctional or polyfunctional epoxy compounds in combination with e.g. hardeners based on amines, anhydrides, dicyandiamide, mercaptans, isocyanates or catalytically acting hardeners, p) phenol resins such as phenol formaldehyde resins, urea formaldehyde resins, melamine formaldehyde resins, q) unsaturated polyester resins of unsaturated dicarboxylic acids and diols with vinyl compounds such as styrene, alkyd resins, r) silicons, e.g. based on dimethyl siloxanes, methyl phenyl siloxanes, or diphenyl siloxanes, e.g. vinyl group terminated s) and mixtures, combinations, or blends of two or more of the above-named polymers.

If the polymers listed under a) to r) are copolymers, they can be present in the form of statistical ("random") structures, block structures, or tapered structures. Said polymers can furthermore be present in the form of linear, branched, star-shaped, or hyper-branched structures.

If the polymers listed under a) to 4) are stereoregular polymers, they can be present in the form of isotactic, stereotactic, but also atactic forms or as stereo block copolymers.

The polymers listed under a) to r) can furthermore comprise both amorphous and (part) crystalline morphologies.

Optionally, the polyolefins named under a) can also be present as cross-linked, e.g. cross-linked polyethylene that is then called X-PE.

Said polymers a) to r) can here not only be present as new products, but also in the form of recyclates, e.g. as production waste or from collections of recyclables (post-consumer recyclates).

For the terminological definition of plastic recyclates, in a further preferred embodiment they are recyclate plastics or recycled plastics. Reference is made to the standard DIN EN 15347:2007 with respect to the definition of terms in which the term plastic recyclate is defined. This definition is also used as the basis for the purpose of the present invention.

The recycled plastic is here particularly preferably selected from the group comprising recycled polyesters, in particular recycled polyethylene terephthalate (rPET), recycled polybutylene terephthalate (rPBT), recycled poly lactic acid (rPLA), recycled polyglycolide and/or recycled polycaprolactone; recycled polyolefins, in particular recycled polypropylene (rPP), recycled polyethylene and/or recycled polystyrene (rPS); recycled polyvinyl chloride (rPVC), recycled polyamides, and mixtures and combinations thereof.

Relevant international standards exist for many plastic recyclates. DIN EN 15353:2007 is relevant to PET plastic recyclates. PS recyclates are described in more detail in DIN EN 15342:2008. PE recyclates are treated in DIN EN 15344:2008. PP recyclates are characterized in DIN EN 15345:2008. PVC recyclates are defined in more detail in DIN EN 15346:2015. For the purposes of the corresponding specific plastic recyclates, the present patent application incorporates the definitions of these international standards.

The present compounds can furthermore be used for the stabilization of rubbers and elastomers. It can be a case of natural rubber (NR) or synthetic rubber materials.

If the organic materials are oils and fats, they can be on the basis of mineral oils, vegetable fats, or animal fats, or also oils, fats, or waxes on the basis of e.g. synthetic esters. Vegetable oils and fats are, for example, palm oil, olive oil, rape oil, linseed oil, soybean oil, sunflower oil, castor oil; animal fats are, for example, fish oils or suet.

The compounds in accordance with the invention can furthermore be used for stabilizing low molecular or oligomeric polyols such as are used in the manufacture of polyurethane. Suitable hydroxy compounds are, for example, butane-1,4-diol, oligomeric ethylene glycols, or tetrahydrofuran oligomers.

The compounds in accordance with the invention can furthermore be used as stabilizers of lubricants, hydraulic oils, engine oils, turbine oils, transmission oils, metal machining fluids, or as lubricating greases. These mineral or synthetic lubricants are primarily based on hydrocarbons.

It is possible and advantageous in this respect that the plastic, for example the plastic molding material, includes at least one further additive selected from the group comprising UV absorbers, light stabilizers, hydroxylamine based stabilizers, benzofuranone based stabilizers, nucleation agents, toughening agents, plasticizers, mold lubricants, rheology modifiers, chain extenders, processing aids, pigments, dyestuffs, optical brighteners, antimicrobial agents, antistatic agents, slip agents, anti-blocking agents, coupling agents, dispersing agents, compatibilizers, oxygen scavengers, acid scavengers, marking agents, and anti-fogging agents.

Possible further additives are selected from the groups of the UV absorbers, light stabilizers, stabilizers, hydroxylamines, benzofuranones, nucleation agents, toughening agents, plasticizers, mold lubricants, rheology modifiers, chain extenders, processing aids, pigments, dyestuffs, optical brighteners, antimicrobial agents, antistatic agents, slip agents, anti-blocking agents, coupling agents, dispersing agents, compatibilizers, oxygen scavengers, acid scavengers, marking agents, or anti-fogging agents. In a preferred embodiment, the compositions in particular include acid scavengers, e.g. based on salts of long chain acids such as calcium stearate, magnesium stearate, zinc stearate, calcium lactate, or of hydrotalcites. In a further preferred embodiment, the compositions include stabilizers from the group of phenolic antioxidants and of phosphites/phosphonites, hydroxylamines, amines, lactones, thio compounds and/or light stabilizers from the group of hindered amines (HALS) and/or UV absorbers.

Suitable light stabilizers are, for example, compounds based on 2-(2'-hydroxyphenyl) benzotriazoles, 2-hydroxy benzophenones, esters of benzoic acids, acrylates, oxamides, and 2-(2-hydroxyphenyl)-1,3,5-triazines.

Suitable 2-('hydroxyphenyl)benzotriazoles are, for example, 2-(2'-hydroxy-5'methylphenyl)benzotriazole, 2-(3',5-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxy-carbonyl-ethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the product of the transesterification of 2-[3'-tert-butyl-5'-(2-methoxycarbonylethyl)-2'-hydroxyphenyl]-2H-benzotriazole with polyethylene glycol 300; [R—CH2CH2-COO—CH2CH2-]-2, where R=3'-tert-butyl-4'-hydroxy-5'-2H-benzotriazole-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-di methyl benzyl)phenyl]benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethyoxy derivatives of the 2-hydroxy benzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-(3-methyl-p-methoxycinnamate, methyl-α-carbomethoxy-p-methoxycinnamate and N-(β-carbomethoxy-(3-cyanovinyl)-2-methylindoline.

Suitable esters of benzoic acid are, for example 4-tert-butylphenyl salicylate, phenylsalicylate, octylphenylsalicylate, dibenzoyl resorcinol, bis(4-tert-butylbenzoyl)resorcinol, benzoyl resorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-di methylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable phenolic antioxidants include, for example:

alkylated monophenols such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures hereof;

alkylthio methylphenols such as 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones such as 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisol, 3,5-di-tert-butyl-4-hydroxyanisol, 3,5-di-tert-butyl-4-hydroxyphenylstearate, bis(3,5-di-tert-butyl-4-hydroxylphenyl)adipate; tocopherols such as α-, β-, γ-, δ-tocopherol and mixtures thereof (vitamin E);

hydroxylated thio diphenylethers such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methyl phenol), 4,4'-thiobis(3,6-di-sec-amylphenol), 4,4'-bis(2,6-dimethyl-4-hydroxyphenyl)disulfide;

alkylidene bisphenols such as 2,2' methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol, 4,4'-methylenebis(6-tert-butyl-2- methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-T-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds such as 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)-dithioterephthalate, bis(3,5-di-tert-butyl-4-hydroxybenzyl)sulfide, isooctyl-3,5-di-tert-butyl tert-butyl-4-hydroxybenzylmercaptoacetate;

hydroxybenzylated malonates such as dioctadecyl-2,2-bis(3,5-di-tert-butyl-2-hydroxybenzyl)malonate, dioctadecyl-2-(3-tert-butyl-4-hydroxy-5-methyl benzyl)-malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

aromatic hydroxybenzyl compounds such as 1,3,5-tris(3,5-di-tert-butyl-4-hydroxybenzyl)-2,4,6-trimethylbenzol, 1,4-bis(3,5-di-tert-butyl-4-hydroxybenzyl)-2,3,5,6-tetramethylbenzol, 2,4,6-tris(3,5-di-tert-butyl-4-hydroxy benzyl) phenol;

triazine compounds such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-Tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroyphenylpropionyl)hexahydro-1,3,5-triazine, 1,3,5-tris(3,5-dicyclohexyl-4-hydroxybenzyl)isocyanurate;

benzylphosphonates such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of the 3,5-di-tert-butyl-4-hydroxybenzylphosphonic acid;

acylaminophenols such as 4-hydroxylauranilide, 4-hydroxystearanilide, octyl-N-(3,5-di-tert-butyl-4-hydroxyphenyl)carbamate;

esters of the (3-(3,5-di-tert-butyl-4-hydroxyphenyl)propionic acid with monovalent or polyvalent alcohols, e.g. methanol, ethanol, n-octanol, i-octanol, octadecanol, 1,6-hexanediol, 1,9-nonanediol, ethylene glycol, 1,2-propanediol, neopentyl glycol, thio diethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of the β-(5-tert-butyl-4-hydroxy-3-methylphenyl)propionic acid with monovalent or polyvalent alcohols such as methanol, ethanol, n-octanol, i-octanol, octadecanol, 1,6-hexanediol, 1,9-nonanediol, ethylene glycol, 1,2-propanediol, neopentyl glycol, thio diethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxa bicyclo [2.2.2]octa ne, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of the β-(3,5-dicyclohexyl-4-hydroxyphenyl)propionic acid with monovalent or polyvalent alcohols, e.g. methanol, ethanol, octanol, octadecanol, 1,6-hexanediol, 1,9-nonanediol, ethylene glycol, 1,2-propanediol, neopentyl glycol, thio diethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of the β-(3,5-di-tert-butyl-4-hydroxyphenyl)acetic acid with monovalent or polyvalent alcohols, e.g. methanol, ethanol, octanol, octadecanol, 1,6-hexanediol, 1,9-nonanediol, ethylene glycol, 1,2-propanediol, neopentyl glycol, thio diethylene glycol, diethylene glycol, triethylene glycol, pentaerythritol, tris(hydroxyethyl)isocyanurate, N,N'-bis(hydroxyethyl)oxamide, 3-thiaundecanol, 3-Thiapentadecanol, trimethylhexanediol, trimethylolpropane, 4-hydroxymethyl-1-phospha-2,6,7-trioxabicyclo[2.2.2]octane;

amides of the (3-(3,5-di-tert-butyl-4-hydroxyphenyl)propionic acid such as N,N'-bis(3,5-di-tert-butyl-4-hydroxyphenylpropionyl)hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide;

ascorbic acid (vitamin C).

Particularly preferred phenolic antioxidants are the following structures:

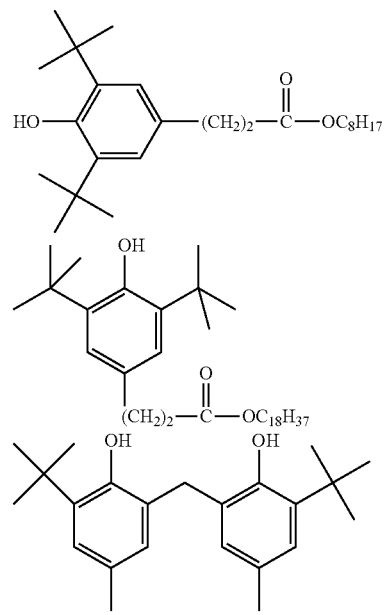

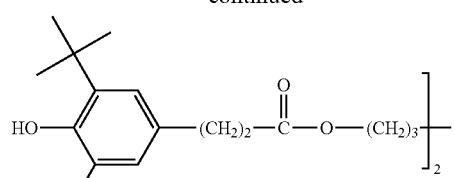
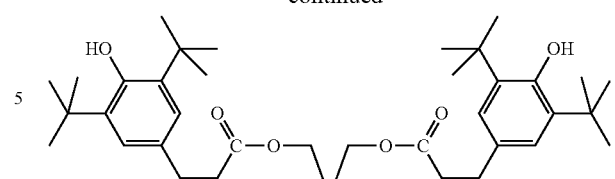
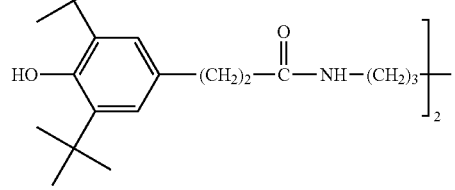
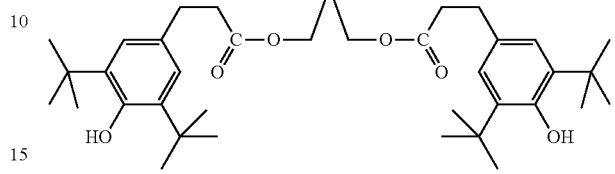
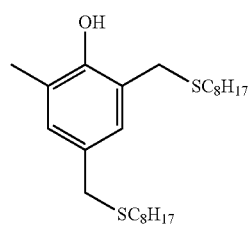
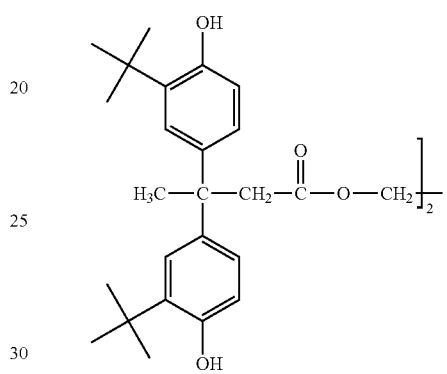
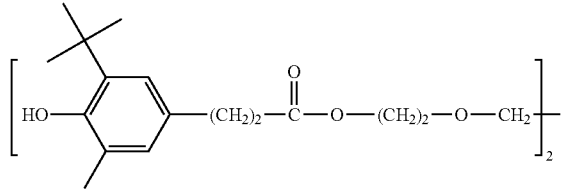
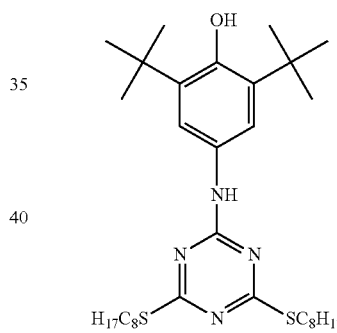
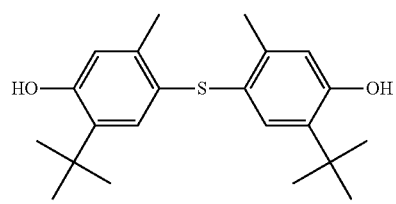
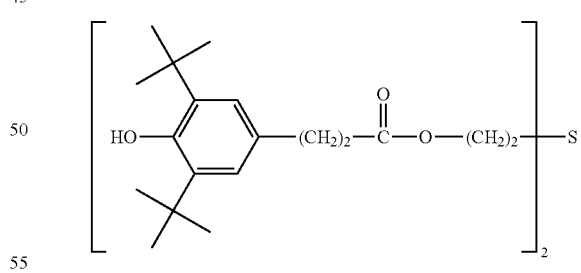
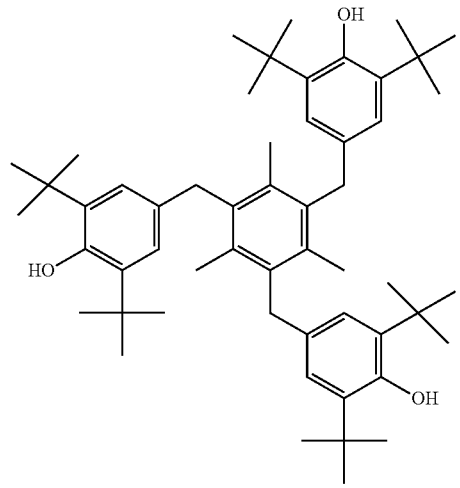
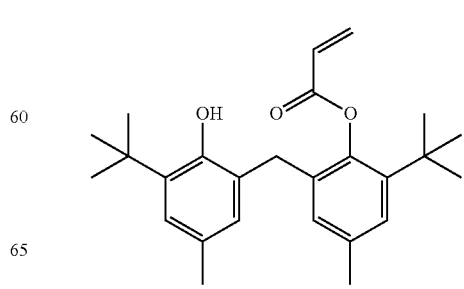

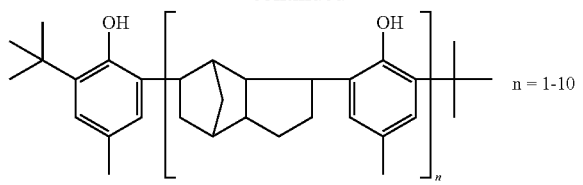

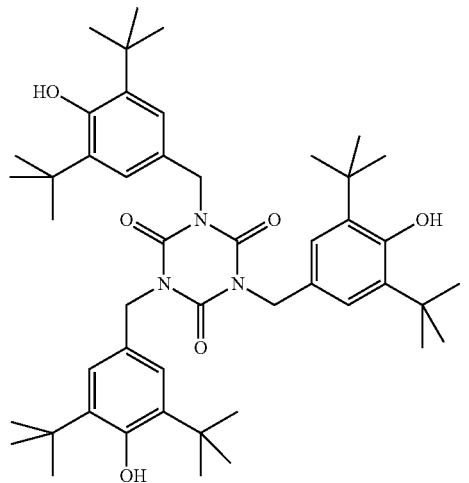

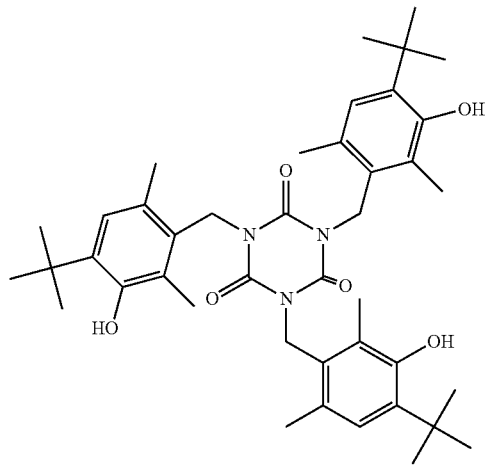

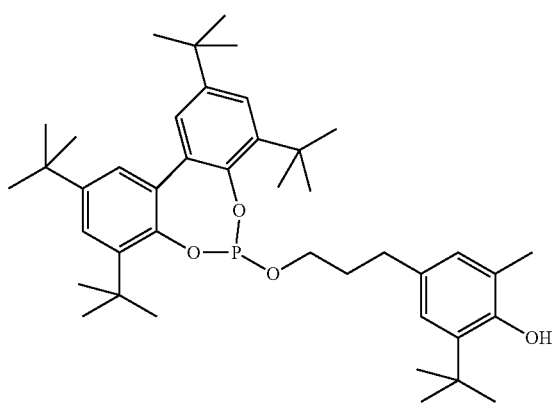

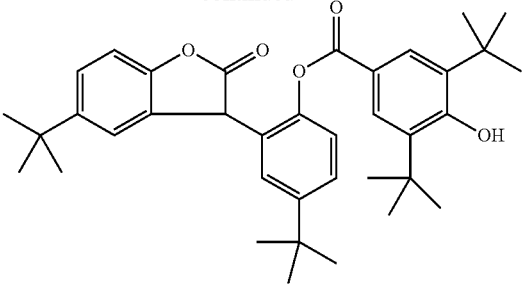

Suitable phosphites/phosponitesare, for example: triphenylphosphite, diphenylalkylphosphites, phenyldialkylphosphites, tri(nonylphenyl)phosphite, trilaurylphosphites, trioctadecylphosphite, distearylpentaerythritoldiphosphite, tris-(2,4-di-tert-butylphenyl) phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl)pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methylphosphite, bis(2,4-di-tert-butyl-6-methylphenyl) ethylphosphite, 6-fluoro-2,4,8,10-tetra-tert-butyl-12-methyl-dibenz[d,g]-1,3,2-dioxaphosphocine, 2,2'2"-nitrilo[triethyltris(3,3",5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Further suitable phosphites are the commercial products Weston 705 (manufacturer: Addivant) and Doverphos LGP 11 (manufacturer: Dover Chemical Corporation), with them being liquid phosphites.

Particularly preferred phosphites/phosphonites are:

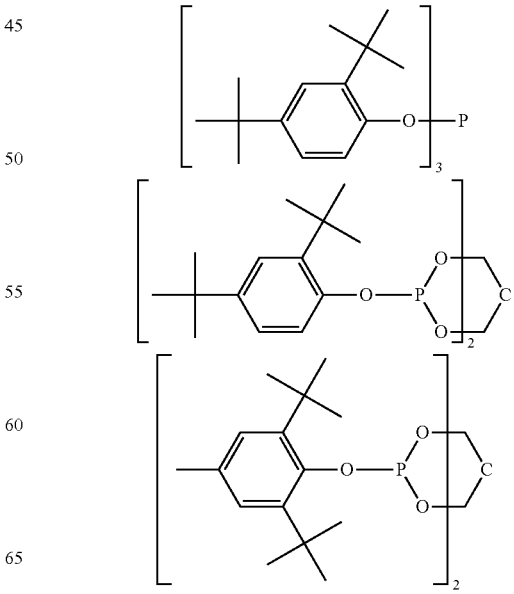

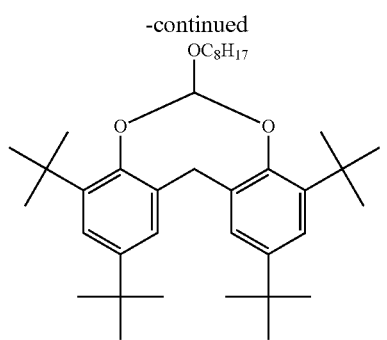
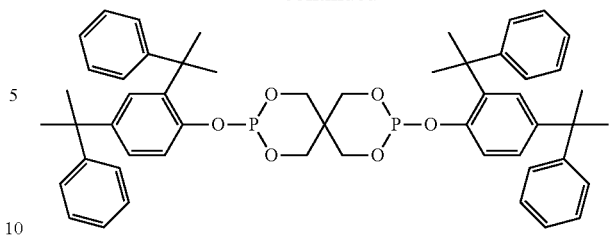
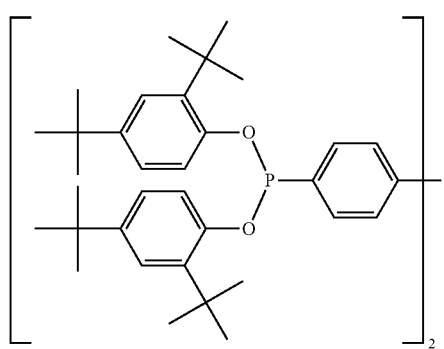
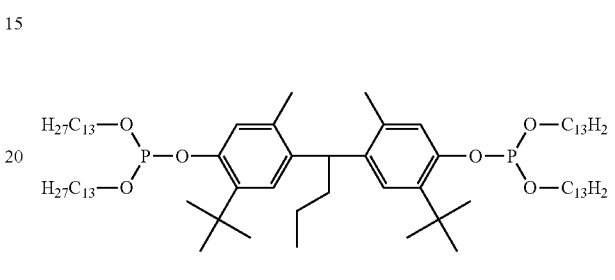
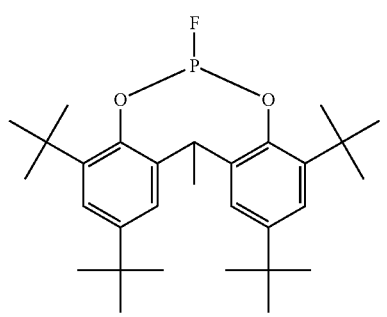
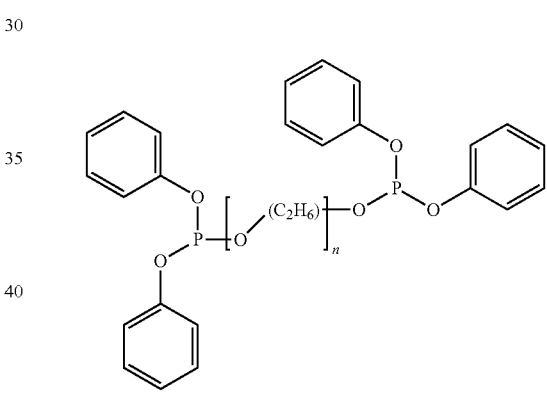
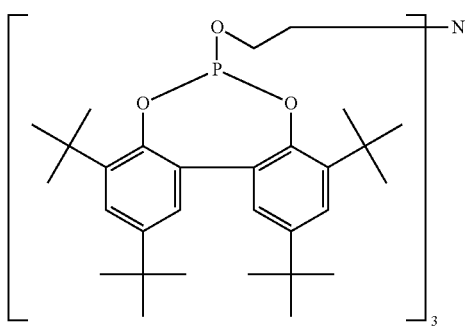
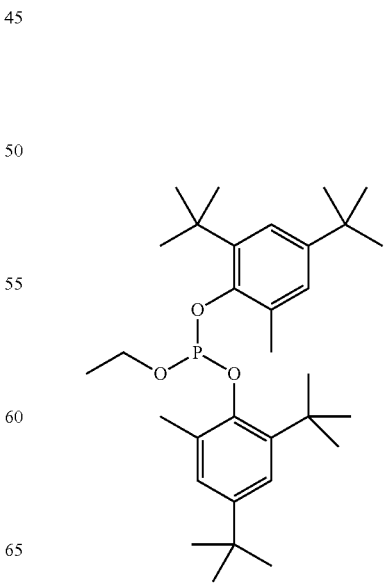
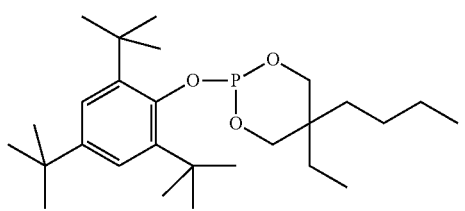

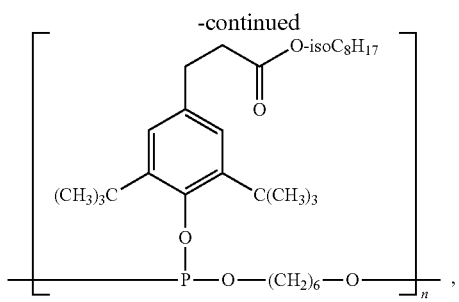

where n>1

Suitable aminic antioxidants are, for example: N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene-diamine, N-(1-methylheptyl)-N'-phenyl-p-phenylene diamine, N-cyclohexyl-N'-phenyl-p-phenylene diamine, 4-(p-toluolsulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetra-methyl-4,4'-diaminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, Cert-octylated N-phenyl-1-naphthylamine, a mixture of monoalkylated and dialkylated tert-butyl/tert-octyldiphenylamines, a mixture of monoalkylated and dialkylated nonyldiphenylamines, a mixture of monoalkylated and dialkylated dodecyldiphenylamines, a mixture of monoalkylated and dialkylated isopropyl/isohexyl-diphenylamines, a mixture of monoalkylated and dialkylated tert-butyldiphenylamines, 2,3-dihydro-3,3-dimethyl-4H-1,4-benzothiazine, phenothiazine, a mixture of monoalkylated and dialkylated tert-butyl/tert-octylphenothiazines, a mixture of monoalkylated and dialkylated tert-octylphenothiazines, N-allylphenothiazine, N,N,N',N'-tetraphenyl-1,4-diaminobut-2-ene and mixture or combinations hereof.

Further preferred aminic antixodants are hydroxylamines or N-oxides (nitrons) such as N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and Genox EP (Addivant) in accordance with the formula:

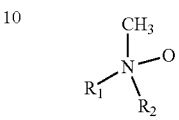

Genox EP
$R_1, R_2 = C_{14}\text{-}C_{24}$ Alkyl

Further suitable stabilizers are thiosynergists. Suitable thiosynergists are, for example, distearyl thiodipropionate, dilauryl thiodiopropionate, or the compound in accordance with the following formula:

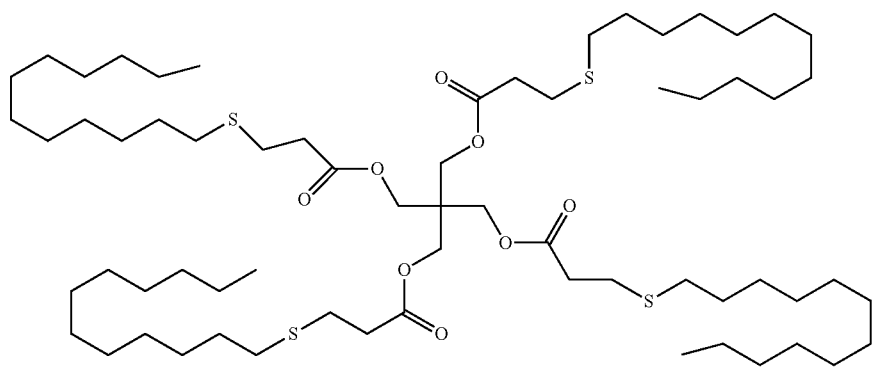 [SMILES: CCCCCCCCCCCCSCCC(=O)OCC(COC(=O)CCSCCCCCCCCCCCC)(COC(=O)CCSCCCCCCCCCCCC)COC(=O)CCSCCCCCCCCCCCC]

Further suitable stabilizers, in particular for polyamides, are copper salts such as copper-(I) iodide, copper-(I) bromide, or copper complexes such as triphenylphosphine copper-(I) complexes Suitable hindered amines are, for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product from 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylene diamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylene diamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorohydrin.

Preferred hindered amines furthermore have the following structures:

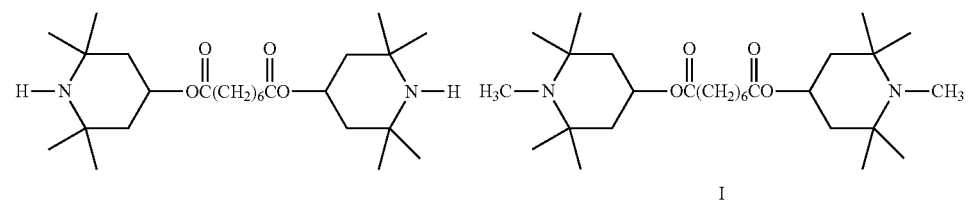
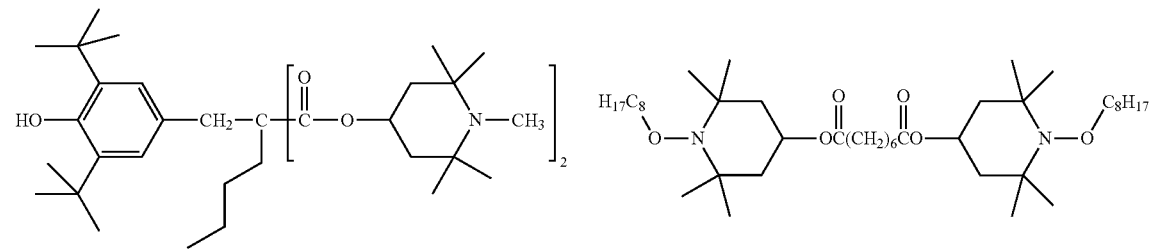
I
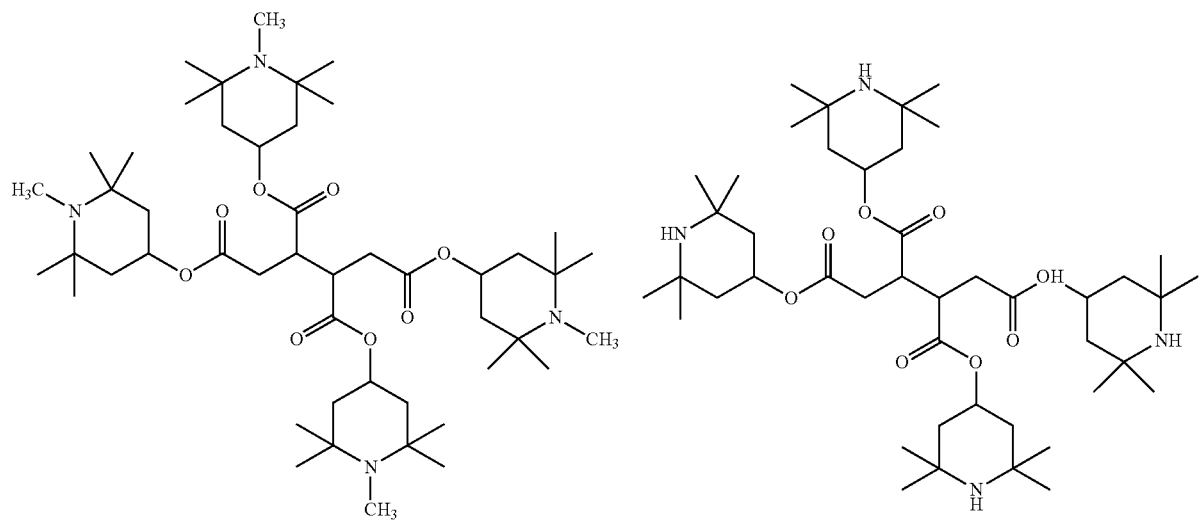
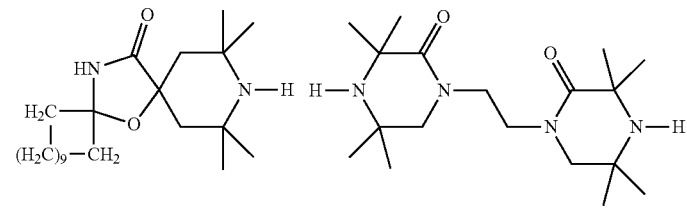
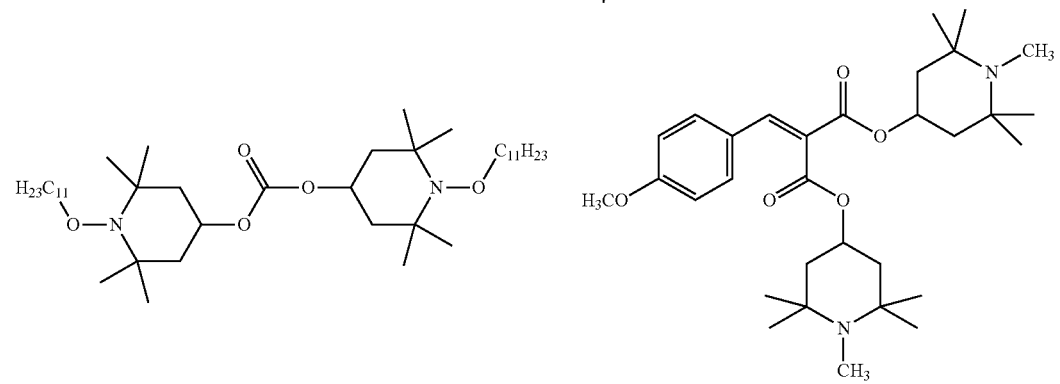

-continued
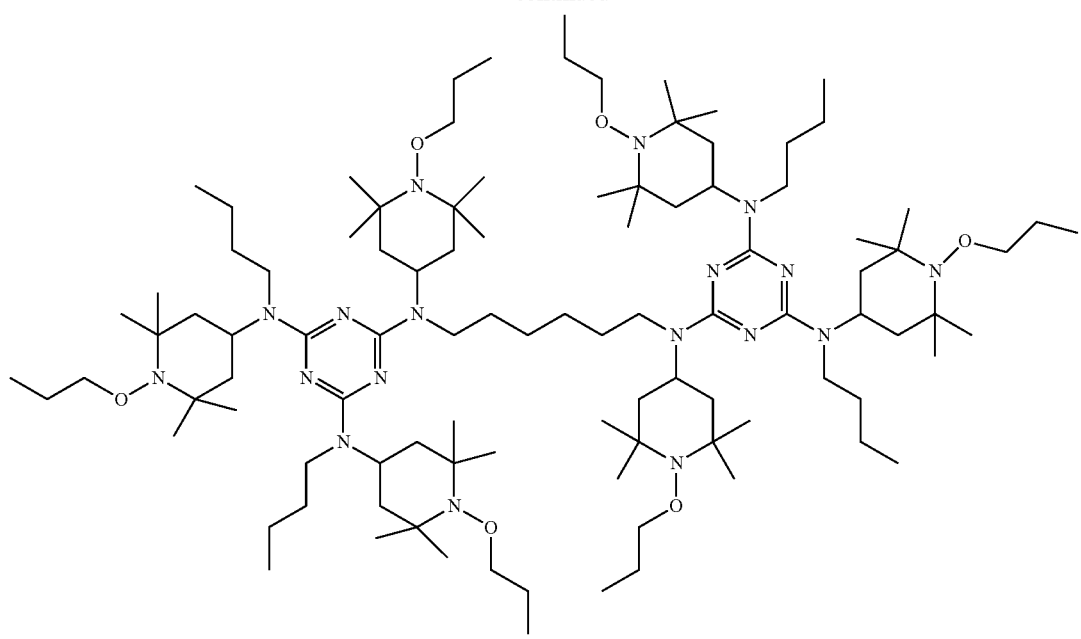
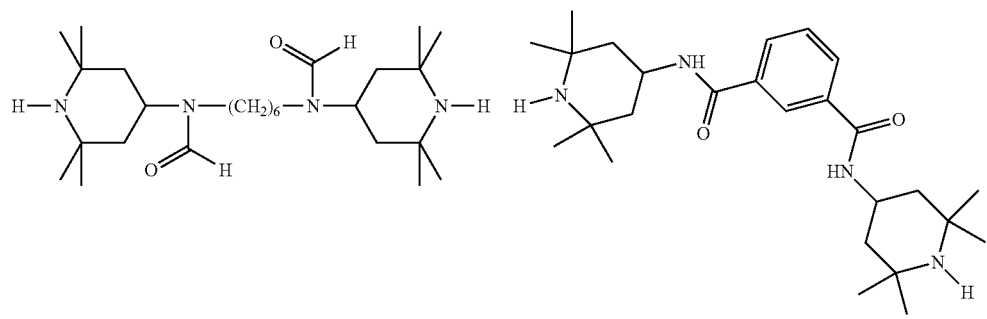
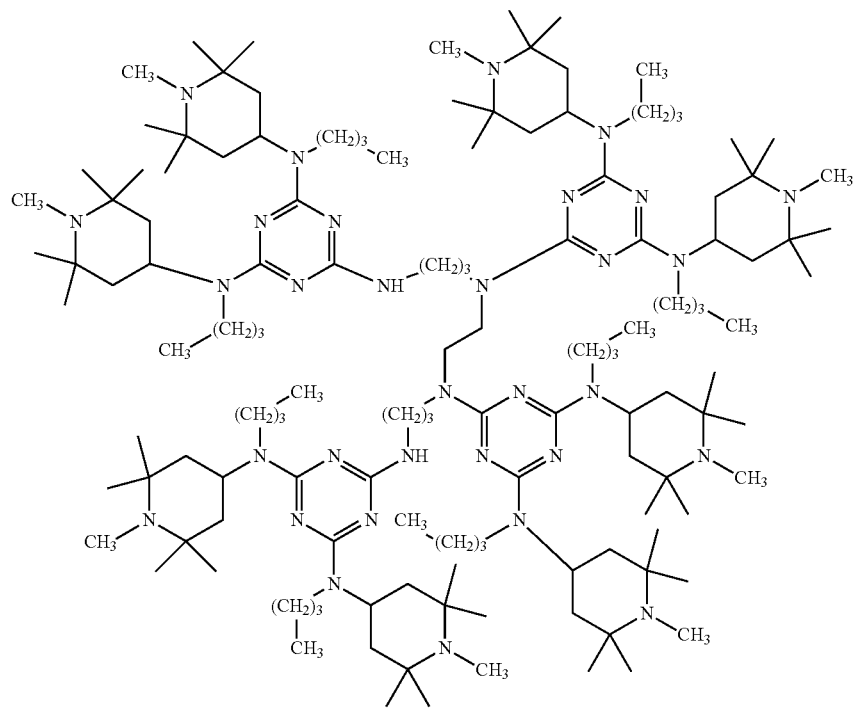

Preferred oligomeric and polymeric hindered amines have the following structures:
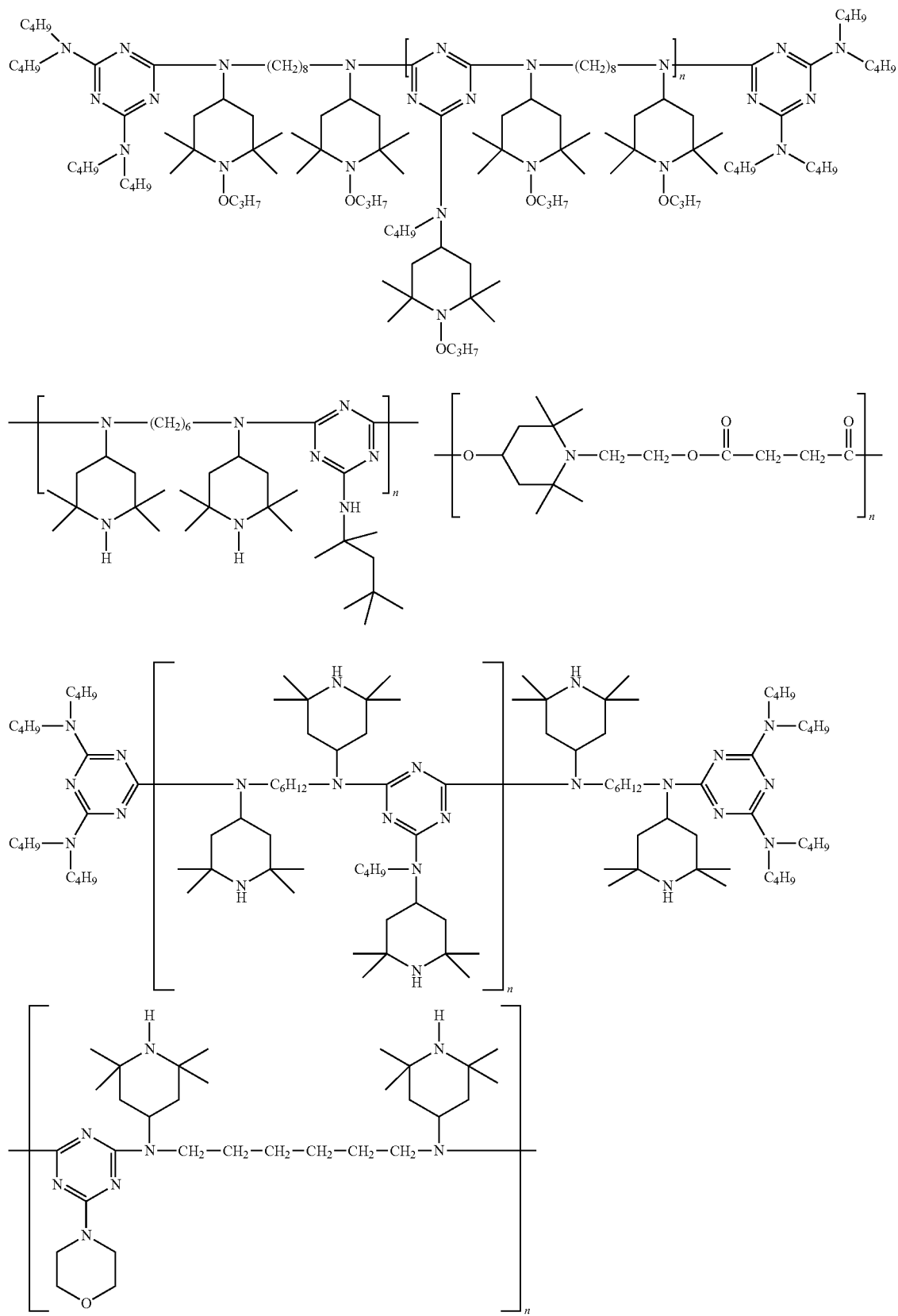

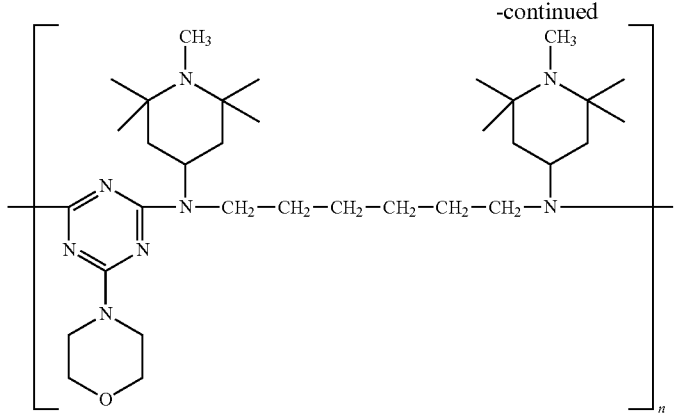
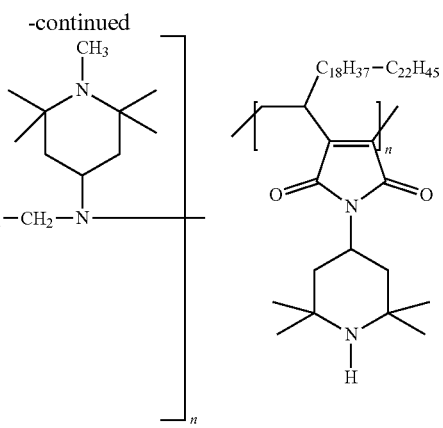
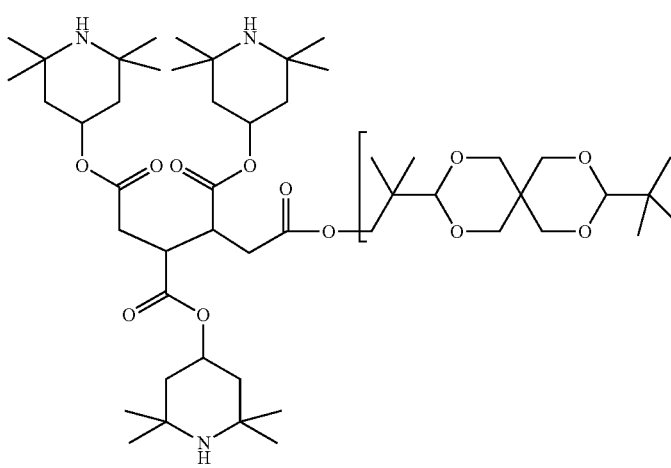
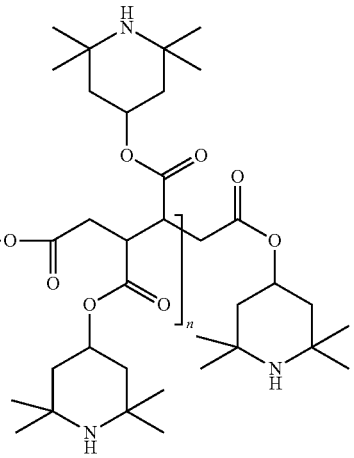
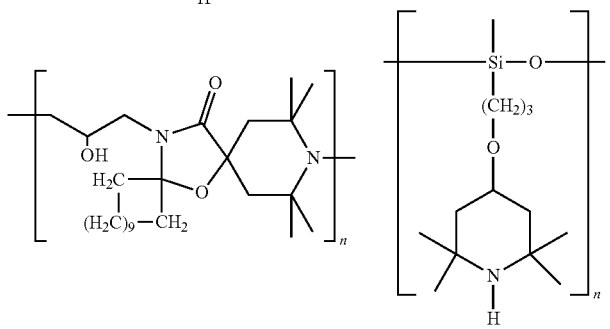

Suitable lactones are, for example: 5,7,di-tert-butyl-3-(3,4-dimethyl phenyl)-3H-benzofuran-2-one-5,5-di-tert-butyl-3-[-4-(2-stearoyloxy ethoxy)phenyl]-benzofuran-2-one, 3-(4-acetoxy-3,5-dimethylphenyl)-5,7-di-ter-butyl-benzofuran-2-one), and phosphorous 3-phenyl benzofuran-2-one.

Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyldihydrazide, oxanilide, isophthaloyldihydrazide, sebacoyl-bis-phenylhydrazide, N,N'-diacetyladipoyldihydrazide, N,N'-bis(salicyloyl)oxylyldihydrazide, N,N'-bis(salicyloyl)thiopropionyldihydrazide.

Suitable dispersion agents are, for example: polyacrylates, e.g. copolymers having long-chain side groups, polyacrylate block copolymers, alkylamides: e.g. N,N'-1,2-ethane diylbisoctadecane amide, sorbitan ester, e.g. monostearylsorbitan esters, titanates and zirconates, reactive copolymers having functional groups, e.g. polypropylene-co-acrylic acid, polypropylene-co-maleic acid anhydride, polyethylene-co-glycidylmethacrylate, polystyrene-alt-maleic acid anhydride-polysiloxanes: e.g. dimethylsilanediol-ethylene oxide copolymers, polyphenylsiloxane copolymers, amphiphilic copolymers: e.g. polyethylene block polyethylene oxide, dendrimers, e.g. dendrimers containing hydroxyl groups.

Suitable nucleation agents include, for example, talcum, alkali, or alkaline earth salts of monofunctional and polyfunctional carboxylic acids such as benzoic acid, succinic acid, adipic acid, e.g. sodium benzoate, zinc glycerolate, aluminum hydroxy-bis)4-tert-butyl)benzoate, benzylidene sorbitols such as 1,3:2,4-bis(benzylidene)sorbitol or 1,3:2,4-bis(4-methylbenzylidene)sorbitol, 2,2'-methylene-bis-(4,6-di-tert-butylphenyl)phosphate, and trisamides and diamides such as trimesinic acid tricyclohexylamide, trimesinic acid tri(4-methylcyclohexylamide), trimesinic acid tri(tert-butylamide), N,N',N"-1,3,5-benzoltriyltris(2,2-dimethyl-propanamide) or 2,6-naphthalindicarboxylic acid dicyclohexylamide.

Suitable antinucleation agents are azine dyes such as nigrosine, ionic liquids and/or lithium salts.

Suitable flame retardant agents are, for example:

a) inorganic flame retardant agents such as $Al(OH)_3$, $Mg(OH)_2$, $AlO(OH)$, $MgCO_3$, phyllosilicates such as montmorillonite or sepiolite, unmodified or organically modified, double salts such as Mg—Al-silicates, POSS (polyhedral oligomeric silsesquioxane) compounds, huntite, hydromagnesite or halloysite and $Sb_2O_3$, $Sb_2O_5$, $MoO_3$, zinc stannate, zinc hydroxystannate, b) flame retardant agents containing nitrogen such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phopsphate, and the corresponding pyrophosphates and polyphosphates, poly-[2,4-(piperazine-1,4-yl)-6-(morpholine-4-yl)-1,3,5-triazine], ammonium polyphosphate, melamine borate, melamine hydrobromide, c) radical formers such as alkoxyamines, hydroxylamine esters, azo compounds, sulfenamides, sulfenimides, dicumyl or polycumyl, hydroxyimides and their derivatives such as hydroxyimide esters or hydroxyimide ethers, d) flame retardant agents containing phosphorus such as red phosphorus, phosphates such as resorcin diphosphate, bisphenol-A-diphosphate, and their oligomers, triphenylphosphate, ethylene diamine diphosphate, phosphinates such as salts of the hypophosphorous acid and their derivatives such as alkylphosphinate salts, e.g. diethylphosphinate aluminum or diethylphosphinate-zinc or aluminum phosphinate, aluminum phosphite, aluminum phosphonate, phosphonate ester, oligomer and polymer derivatives of the methane phosphonic acid, 9,10-dihydro-9-oxa-10-phosphorylphenanthrene-10-oxide (DOPO) and their substituted compounds, e) Flame retardant agents containing halogen based on chlorine and bromine such as polybrominated diphenyl oxides such as decabromodiphenyloxide, tris(3-bromo-2,2-bis(bromomethyl)propyl-phosphate, tris(tribromo-neopentyl)phosphate, tetrabromophthalic acid, 1,2-bis(tribromophenoxy)ethane, hexabromocyclododecane, brominated diphenylethane, tris-(2,3-dibrompropyl) isocyanurate, ethylene-bis-(tetrabromophthalimide), tetrabromo-bisphenol A, brominated polystyrene, brominated polybutadiene or polystyrene brominated polybutadiene copolymers, brominated polyphenylene ether, brominated epoxy resin, polypentabromobenzy-lacrylate, optionally in combination with $Sb_2O_3$ and/or $Sb_2O_5$, f) borates such as zinc borate or calcium borate, optionally on a carrier material such as silica g) compounds containing sulfur such as elemental sulfur, disulfides and polysulfides, thiuram sulfides, dithiocarbamates, mercaptobenzthiazole and sulfene amides, h) anti-drip agents such as polytetrafluoroethylene, i) compounds containing silicon such as polyphenylsiloxanes, j) carbon modifications such as carbon nanotubes (CNTs), exfoliated graphite or graphene k) and combinations or mixtures hereof.

Suitable fillers and reinforcements are, for example, synthetic or natural materials such as calcium carbonate, silicates, glass fibers, glass spheres (solid or hollow), talcum, micra, kaolin, barium sulfate, metal oxides and metal hydroxides, black carbon, graphite, carbon nanotubes, graphene, wood flour, or fibers of natural products such as cellulose or synthetic fibers. Further suitable fillers include hydrotalcites or zeolites or phyllosilicates such as montmorillonite, bentonite, beidellite, mica, hectorite, saponite, vermiculite, ledikite, magadite, illite, kaolinite, wollastonite, attapulgite, halloysite.

Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, diketop-tyrrolopyrrols, dioxazines, inanthrones, isoindolines, azo compounds, perylenes, phthalocyanines or pyranthrones. Further suitable pigments include effect pigments on a metal base or pearl gloss pigments on a metal oxide base.

Suitable chain extenders for the linear molecular weight structure of polycondensation polymers such as polyesters or polyamides are, for example, diepoxides, bis-oxazonlines, bis-oxazolones, bis-oxazines, diisoscyanates, dianhydrides, bis-acyllactams, bis-maleimides, dicyanates, (poly) carbodiimides.

Further suitable chain extenders include polymer compounds such as polystyrene polyacrylate polyglycidyl(meth) acrylate copolymers, polystyrene maleic acid anhydride copolymers, and polyethylene maleic acid anhydride copolymers.

Suitable optical brighteners are, for example, bis-benzoxazoles, phenylcumarines, or bis(styryl)biphenyls and in particular optical brighteners of the formulas:

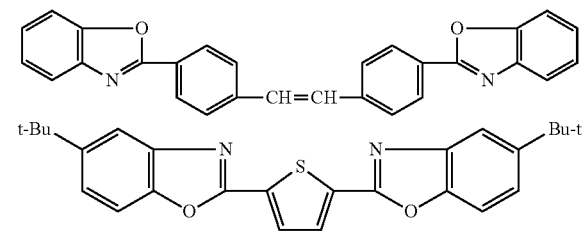

Suitable filler deactivators are, for example, polysiloxanes, polyacrylates, in particular block copolymers such as polymethacrylic acid polyalkyene oxide or polyglycidyl (meth)acrylates and their copolymers, e.g. with styrene and epoxides of the e.g. the following structures:

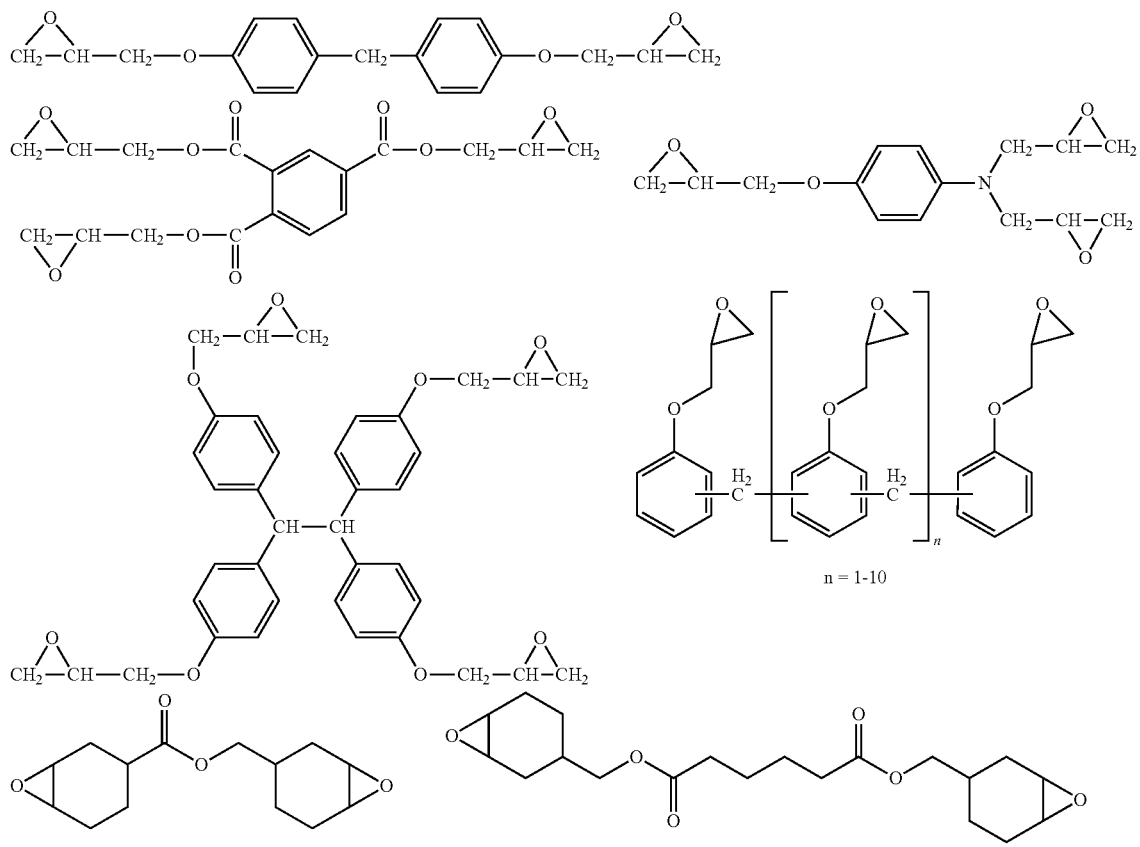

Suitable antistatic agents are, for example, ethoxylated alkylamines, fatty acid esters, alkylsulfonates, and polymers such as polyetheramides.

Suitable antiozonants include the above-named amines such as N,N'-di-isopropyl-p-phenylene diamine, N,N'-di-sec-butyl-p-phenylene diamine, N,N'-bis(1,4-dimethylpentyl)-p-phenylene diamine, N,N'-dicyclohexyl-p-phenylene diamine, N-isopropyl-N'-phenyl-p-phenylene diamine, N-(1,3-dimethylbutyl)-N'-phenyl-p-phenylene diamine, N-(1-methylheptyl)-NT-phenyl-p-phenylene diamine, N-cyclohexyl-N'-phenyl-p-phenylene diamine.

Suitable demolding aids are, for example, montan wax.

The working of the stabilizers and/or of the additive composition and optionally of the additional additives into the plastic takes place by typical processing methods, with the polymers being melted and being mixed with the additive composition in accordance with the invention and the optionally further additives, preferably by mixers, kneaders, and extruders. Extruders such as single-screw extruders, twin screw extruders, planetary gear extruders, ring extruders, and co-kneaders that are preferably equipped with a vacuum degassing are preferred as processing machines. The processing can here take place under air or optionally under inert gas conditions such as under nitrogen as a protective gas.

The additive compositions can furthermore be prepared and introduced in the form of master batches or concentrates that, for example, include 20-90% of the additives or of the additive compositions in accordance with the invention in a polymer. Concentrates are further preferred that comprise the additive and/or the additive composition and a mold lubricant. The mold lubricant is preferably a salt of a long chain fatty acid such as calcium stearate, magnesium stearate, or zinc stearate, a polyethylene wax, or a polypropylene wax. These concentrates can then be present in the form of compacted, pelletized, or extruded product shapes.

It is further advantageous if at least one further primary and/or secondary antioxidant, in particular at least one further primary and/or secondary antioxidant selected from the group comprising phenolic antioxidants, phosphites, phosphonites, amines, hydroxylamines, and mixtures or combinations thereof is/are used to stabilize the organic materials in addition to the compound in accordance with the general formula I.

In the event that the organic materials are plastic compositions or polymer compositions that include the stabilizers in accordance with the invention, they are in particular suitable for the further processing into special moldings such as injection molded parts, foils or films, foams, fibers, cables and pipes, sections, hollow bodies, bands, membranes such as geomembranes that are manufactured by extrusion, injection molding, blow molding, calendering, pressing processes, spin processes, rotomolding or spreading and coating processes, e.g. for the electrical and electronic industry, the construction industry, the transportation industry (automotive, aeronautic, shipbuilding, railroad), for medical applications, for domestic and electric appliances, vehicle parts, consumer articles, packaging, furniture, textiles. These moldings are also included in the present invention.

The compositions in accordance with the invention preferably comprise 0.01-5.0 wt. % of the stabilizers in accordance with the invention in accordance with the general formula I; 0-5.0% of a further additive; and 95-99.99 wt. % of a polymer, particularly preferably 0.02-3 wt. % of the stabilizers in accordance with the invention; 0-3.0% of a further additive, and 97-99.98% of a polymer; 0.05-2 wt. % of the stabilizers in accordance with the invention, 0.2 wt. % of a further additive, and 98-99.95 wt. % of a polymer are very particularly preferred.

The present invention further relates to an organic material that incudes for the purpose of stabilization at least one stabilizer or a mixture of a plurality of stabilizers in accordance with the general formula I, as defined above. All the statements on the general formula I made above apply in the same manner to the purposes of the correspondingly stabilized organic material. The organic material is particularly preferably a plastic composition, in particular having the polymers as described above.

The invention additionally relates to a method of stabilizing organic materials, in particular plastic compositions, particularly preferably against oxidative, thermal and/or actinic degradation, in which a compound or a plurality of compounds in accordance with the general formula I are worked into the organic material. The working in can take place here in any desired manner known from the prior art.

The present invention additionally relates to particularly efficient stabilizers that are characterized in more detail in the following formulas:

Formula II

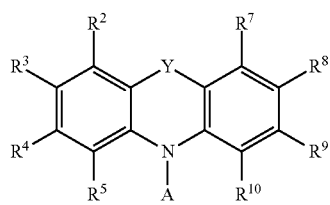

where $R^2$ to $R^5$, $R^7$ to $R^{10}$, Y and A are defined as above, with the proviso that in fragment A X is a sulfur atom and n=1.

Formula III

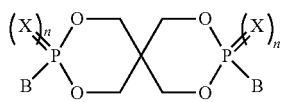

where X, n, and B are defined as above, and

Formula IV

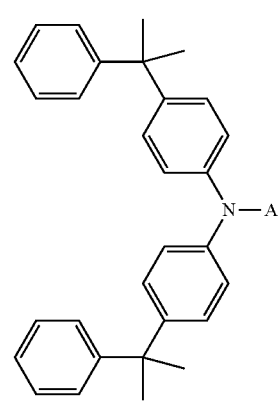

where A is defined as above.

The present invention will be explained in more detail with reference to the following examples without restricting the invention to the specific details.

Synthesis of the New Stabilizers:

The absolute toluol (99.8%) used for the syntheses, lithium diisopropylamide (LDA), and the elementary sulfur (p.a., ≥99.5%) were purchased from Sigma Aldrich; phenothiazine (98%+) from Alfa Asea; acetonitrile, anhydrous diethyl ether, and the 1.6 molar (15%) n-butyl lithium solution in n-hexane from Merck KGaA; and chlorodiphenylphosphine was provided by BASF. The compound 4,4'bis (α,α-dimethylbenzyl)diphenylamine (BDBDA) was purchased from TCI Tokyo Kasei; and absolute tetrahydrofuran from Acros Organics. 2-chloro-5,5-dimethyl-1,3,2-dioxaphosphorinane (DDP-Cl) was synthesized in a manner known from the literature from phosphotrichloride and 1,3-dimethylpropane-1,3-diol.

Embodiment 1

Synthesis of Phenothiazine-DOP:

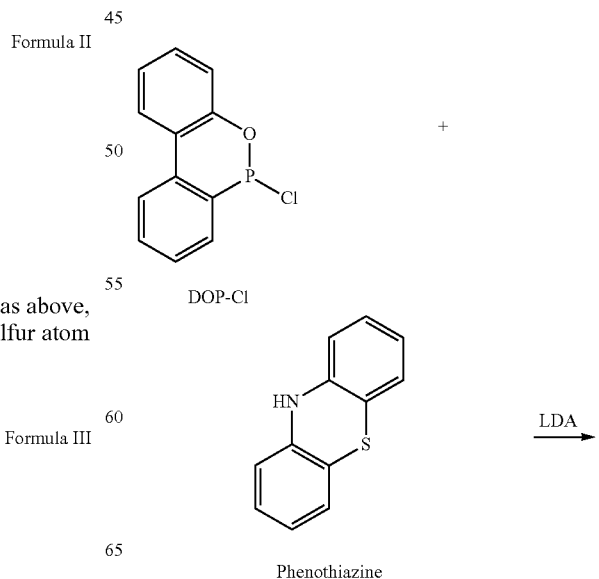

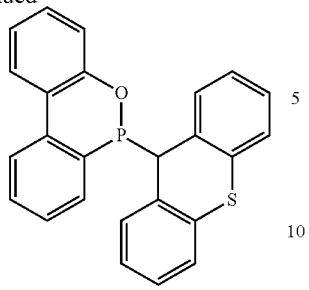

Phenothiazine:DOP

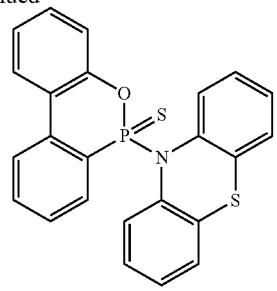

Phenothiazine-DOPS

Absolute toluol (150 ml) and 47.3 g of a 2-molar lithium diisopropylamide solution in THF (LDA; 0.095 mol) were added by means of a syringe through a septum into a carefully dried 500 ml three-necked flask filled with nitrogen that was equipped with a magnetic stirrer, a nitrogen feed, and a pressure-equalizing dripping funnel. Phenothiazine (17.93 g, 0.090 mol) was subsequently added in the nitrogen counterflow. Absolute toluol (120 mL) was added by means of a syringe through a septum and melted DOP-Cl (21.23 g, 0.090 mol) in the nitrogen counterflow into the slightly heated drip funnel (the bottle with the DOP-Cl was previously heated to approximately 100° C. to melt the reagent). The DOP-Cl solution was added drop-wise within 30 min at room temperature while stirring. The reaction mixture was subsequently stirred for a further 1 h at room temperature. Once the solids (predominantly lithium chloride) had been deposited at the base of the flask or at the flask wall, the supernatant solution was decanted under inert conditions. 80 ml of absolute toluol were added to the residue by means of a syringe through a septum. It was stirred for 30 min at 45° C. and was decanted after the deposition of the solid. Both solutions were combined and the toluol was removed in vacuum. The obtained residue was dissolved in 80 ml of dry acetonitrile while heating. On the cooling, the phenothiazine-DOP was separated. After storing the properly closed flask in a refrigerator (approx. 15 h), the supernatant solution was separated by decanting. The adhering solvent was finally removed in vacuum. Phenothiazine-DOP having a yield of 78% was obtained as a white solid in this manner.

$^{31}$P-NMR (300 MHz, CDCl$_3$, 8) δ=94.2 ppm. $^1$H-NMR (300 MHz, CDCl$_3$, 8) δ=7.86–6.77 (m, 16.3H) ppm.

Embodiment 2

Synthesis of Phenothiazine-DOPS:

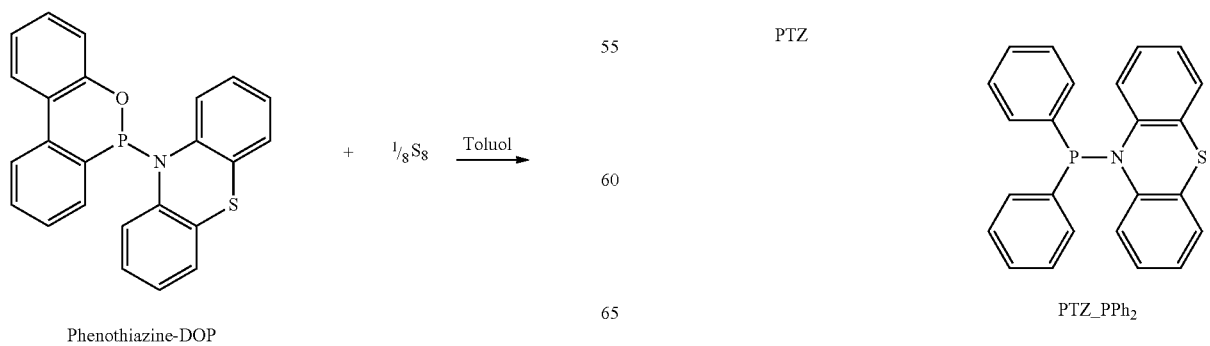

Phenothiazine-DOP 60 ml absolute toluol was added by means of a syringe through a septum into a carefully dried 250 ml three-necked flask filled with nitrogen that was equipped with a magnetic stirrer and a nitrogen feed, and phenothiazine-DOP (4.97 g, 0.013 mol) and elementary sulfur (0.43 g, 0.013 mol) were added in the nitrogen counterflow. The reaction mixture was first stirred for 3 h at 80° C. and then for 30 min at 90° C. A crystalline solid was obtained after the removal of the toluol by distillation in vacuum. The NMR spectroscopic examination shows that the sulfurization reaction had completely taken place while forming phenothiazine-DOPS.

$^{31}$P-NMR (300 MHz, CDCl$_3$, 14) δ=67.4 ppm. $^1$H-NMR (300 MHz, CDCl$_3$, 14) δ=8.11–6.95 (m, 17.5H) ppm.

Embodiment 3

Synthesis of Phenothiazine-PPh2:

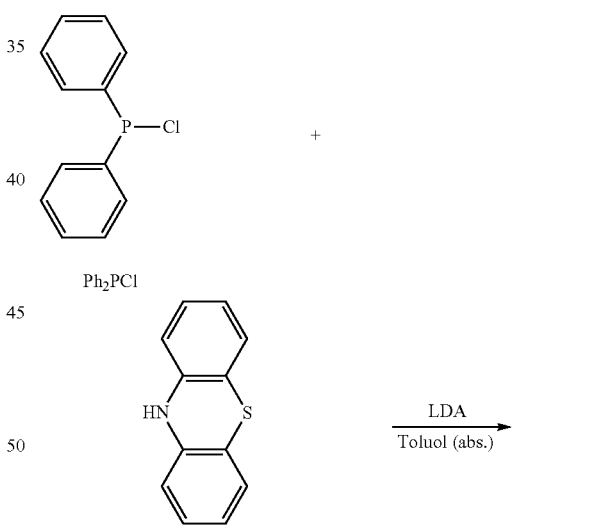

Absolute toluol (40 ml) and LDA (7 ml, 0.014 mol) was added by means of a syringe through a septum into a carefully dried 250 ml three-necked flask filled with nitrogen that was equipped with a magnetic stirrer, a dripping funnel and a nitrogen feed, and phenothiazine (2.39 g, 0.012 mol) was added in the nitrogen counterflow, was heated to approximately 40° C. for the dissolving, and was then cooled in an ice bath. Absolute toluol and chlorodiphenylphosphine (2.65 g, 0.012 mol) were subsequently added by means of a syringe through a septum in the nitrogen counterflow in a dripping funnel and were dripped in within 10 minutes. The reaction mixture was stirred for 1 h in the ice bath. The NMR spectroscopic examination from the reaction solution showed that the desired product had been produced.

31P-NMR (300 MHz, CDCl$_3$) δ=70.3 ppm. 1H-NMR (300 MHz, CDCl$_3$) δ=7.66–6.56 ppm.

Embodiment 4

Synthesis of Phenothiazine-PPh2S:

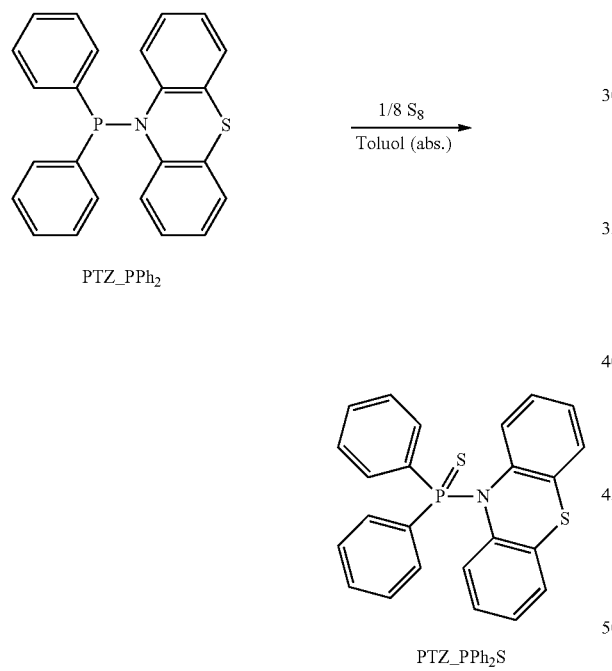

PTZ_PPh$_2$

PTZ_PPh$_2$S

Absolute toluol (60 ml) was added by means of a syringe through a septum into a carefully dried 250 ml three-necked flask filled with nitrogen that was equipped with a magnetic stirrer, reflux condenser and a nitrogen feed, and elementary sulfur (0.42 g, 0.013 mol) was added to the reaction solution obtained in Embodiment 3 in the nitrogen counterflow. The reaction mixture was stirred for 3 h at 80° C. and was stored overnight in a refrigerator (2° C.). The precipitate was filtered off, the filtrate was concentrated by removing the toluol by means of distillation in vacuum, was cooled again, and the precipitate was again filtered off. The product of acetonitrile was subsequently recrystallized. The yield was 2.74 g (54%). The NMR spectroscopic examination showed that the sulfurization reaction had completely taken place while forming phenothiazine-PPh2S.

$^{31}$P-NMR (300 MHz, CDCl$_3$) δ=62.6 ppm. $^1$H-NMR (300 MHz, CDCl$_3$) δ=8.17–6.89 ppm.

Embodiment 5

Synthesis of Phenothiazine-DDP:

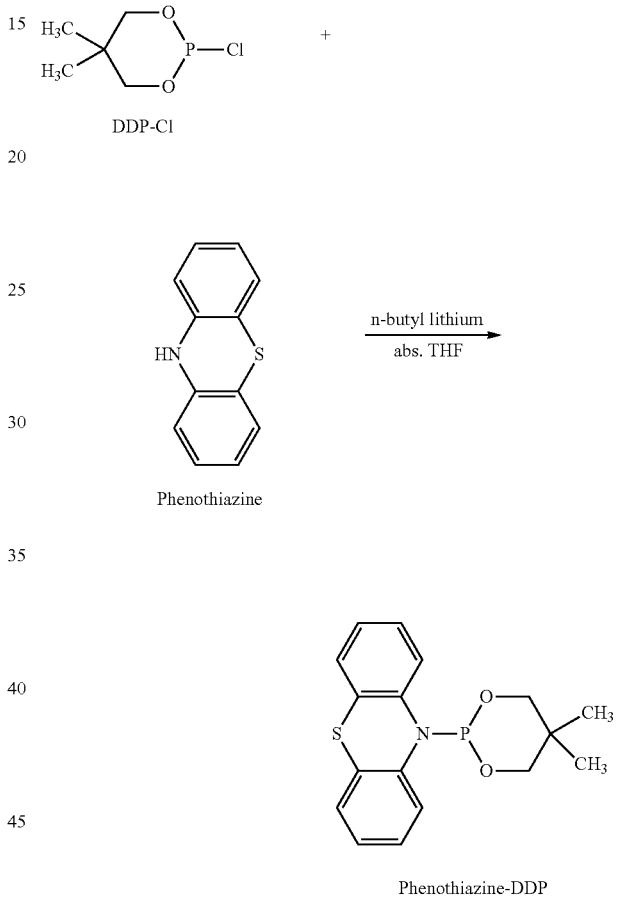

DDP-Cl

Phenothiazine

Phenothiazine-DDP

Absolute THF (40 ml) and phenothiazine (2.99 g, 0.015 mol) were added into a carefully dried 100 ml three-necked flask filled with argon that was equipped with a magnetic stirrer, a septum, and an argon feed. 9.4 ml of a 15% solution of n-butyl lithium in n-hexane (0.015 mol) was then added by means of a syringe through the septum while stirring. Once the flask content had been stirred for 20 min, 2-chloro-5,5-dimethyl-1,3,2-dioxaphosphorinane (DDP-CI, 2.52 g, 0.015 mol) was dripped by means of a syringe through the septum within 10 minutes. The reaction mixture was stirred for 2 h at room temperature. The NMR spectroscopic examination of the reaction solution showed that phenothiazine-DDP had been produced.

$^{31}$P-NMR (300 MHz, CDCl$_3$) δ=127.0 ppm.

Embodiment 6

Synthesis of Phenothiazine-DDPS:

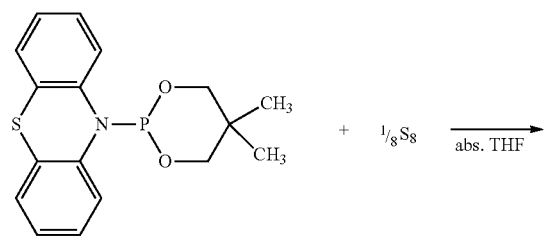

Phenothiazine-DDP

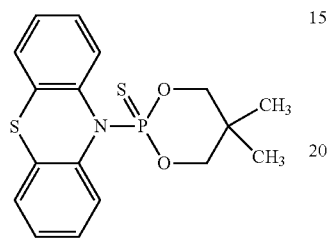

Phenothiazine-DDPS

Elementary sulfur (0.48 g, 0.015 mol) was added to the solution of phenothiazine-DDP in THF obtained in Embodiment 5 in the argon counterflow. Stirring then took place for 3 h at 50° C. The solvent was then removed in vacuum and the residue was recrystallized from acetonitrile. The yield of spectroscopically pure phenothiazine-DDPS amounted to 85%.

$^{31}$P-NMR (300 MHz, CDCl$_3$) δ=56.1 ppm. $^1$H-NMR (300 MHz, CDCl$_3$) δ=7.94–7.14 (m, 8.5H, Ar), 3.83–3.57 (m, 4H, CH$_2$), 1.23 (s, 3H, CH$_3$), 0.76 (s, 3H, CH$_3$) ppm. $^{13}$C-NMR (300 MHz, CDCl$_3$) δ=(140.0, 130.1, 127.7, 127.5, 125.9, 123.7, 77.0, 32.1, 22.1, 21.1) ppm Melting point [° C.]: 205

Embodiment 7

Synthesis of BDBDA-DOP:

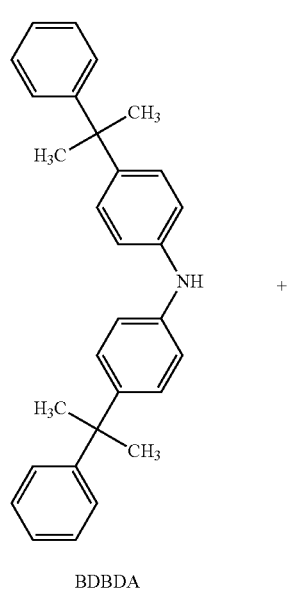

BDBDA

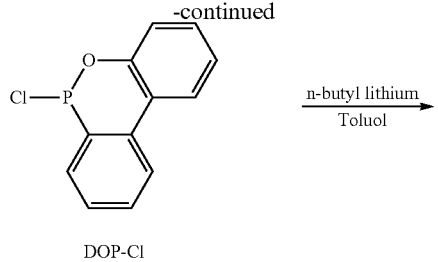

DOP-Cl

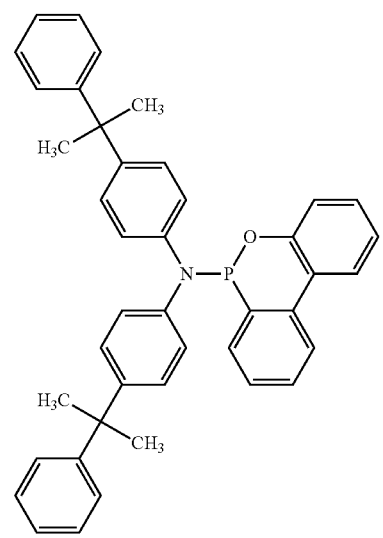

BDBDA-DOP

The apparatus used was carefully dried. The synthesis was carried out under a nitrogen atmosphere.

4.5 g (0.011 mol) 4,44'-bis(α,α-dimethylbenzyl)diphenylamine (BDBDA) were added into a 250 ml three-necked flask that was equipped with a magnetic stirrer, a drip funnel, and an argon feed. Heating then took place for approximately 30 min. at approximately 0.02 mbar in an oil bath (85° C.). After the cooling to room temperature and the filling of the flask with nitrogen, 50 ml dry toluol was added by means of a syringe. Subsequently, 6.9 ml of a 15% solution of n-butyl lithium in n-hexane (0.011 mol) was added by means of a syringe in the course of 10 min. The reaction mixture was heated to approximately 40° C. and then cooled using an ice bath. Subsequently, a solution of 2.6 g (0.011 mol) DOP-Cl in abs. toluol (30 ml) was dripped in within 10 min. The reaction mixture was subsequently stirred for a further 1 h at room temperature. Subsequently, the lithium chloride was filtered off under inert conditions. The solution of BDBDA-DOP thus obtained was used for Embodiment 9.

$^{31}$P-NMR (300 MHz, CDCl$_3$) δ=79.9 ppm.

Embodiment 8

Synthesis of BDBDA-DOPS:

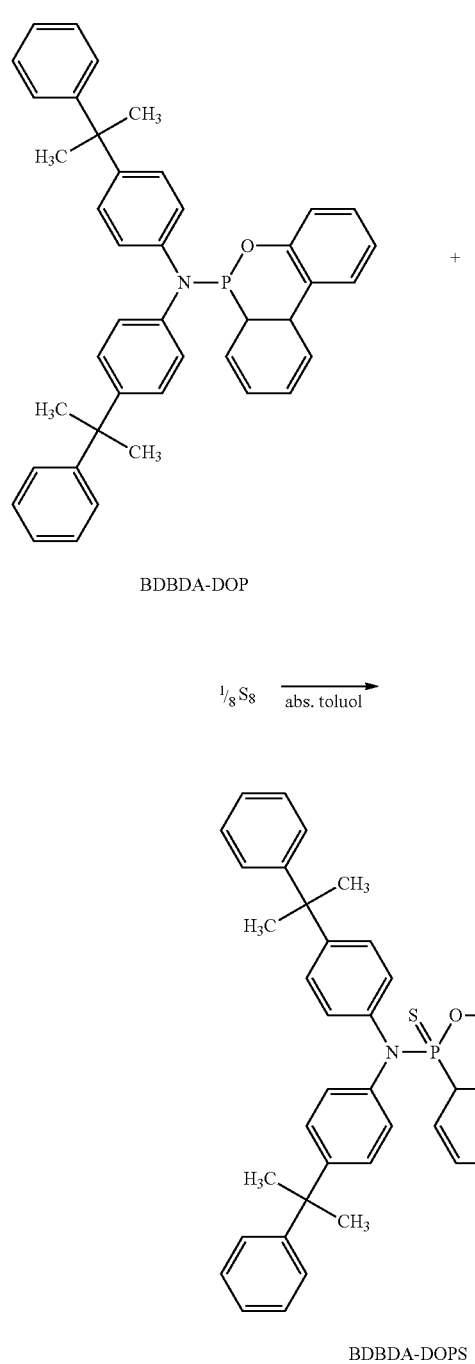

BDBDA-DOP

BDBDA-DOPS

Elementary sulfur (0.45 g, 0.014 mol) was added to the solution of BDBDA-DOP in toluol obtained in Embodiment 7. Stirring then took place for 3 h at 80° C. The solvent was then removed in vacuum. The residue thus obtained was recrystallized from acetonitrile twice.

The yield of spectroscopically pure BDBDA-DOPS amounted to 73%.

$^{31}$P-NMR (300 MHz, CDCl$_3$) δ=66.0 ppm.

Embodiment 9

Synthesis of BDBDA-DPhP:

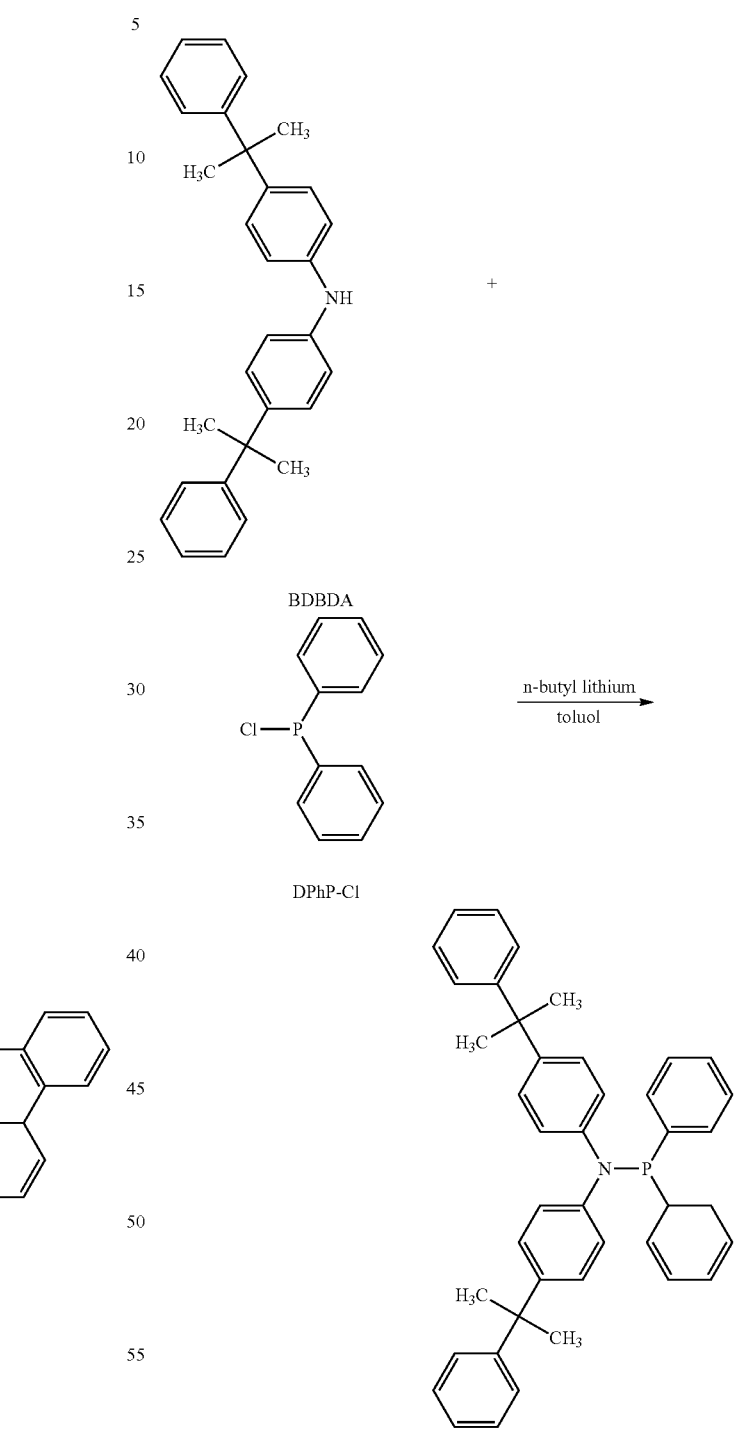

BDBDA

DPhP-Cl

BDBDA-DPhP

The apparatus used was carefully dried. The synthesis was carried out under a nitrogen atmosphere.

6.1 g (0.015 mol) 4,4'-bis(α,α-dimethylbenzyl)diphenylamine (BDBDA) were added into a 250 ml three-necked flask that was equipped with a magnetic stirrer, a drip funnel, and an argon feed. Heating then took place for approximately 30 min. at approximately 0.02 mbar in an oil bath (85° C.). After the cooling to room temperature and the filling of the flask with nitrogen, 50 ml dry toluol was added by means of a syringe. Subsequently, 9.4 ml of a 15% solution of n-butyl lithium in n-hexane (0.015 mol) was added by means of a syringe in the course of 10 min. The reaction mixture was stirred for 30 min. A solution of 3.3 g (0.015 mol) DPhP-C in abs. toluol (30 ml) was then dripped in within 10 min. The reaction mixture was subsequently stirred for 3 h at room temperature. Subsequently, the lithium chloride was filtered off under inert conditions. The solution of BDBDA-DPhP thus obtained was used for Embodiment 10.

$^{31}$P-NMR (300 MHz, CDCl$_3$) δ=54.9 ppm.

Embodiment 10

Synthesis of BDBDA-DPhPS:

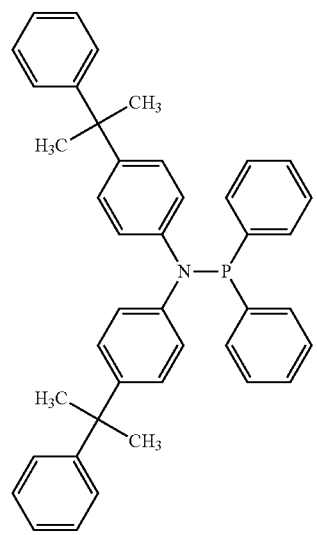

BDBDA-DPhP

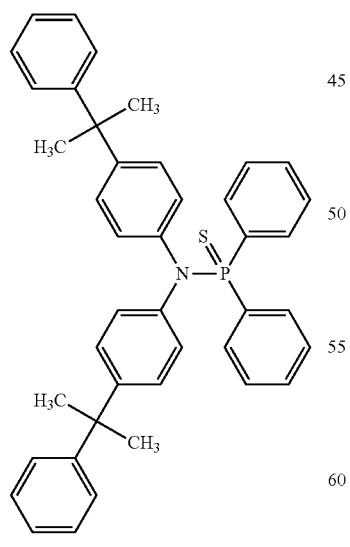

BDBDA-DPhPS

Elementary sulfur (0.58 g, 0.018 mol) was added to the solution of BDBDA-DOP in toluol obtained in Embodiment 9. Stirring then took place for 3 h at 60° C. The solvent was then removed in vacuum. The residue thus obtained was recrystallized from acetonitrile twice. The yield of spectroscopically pure BDBDA-DPhPS amounted to 78% (related to DPhP-Cl).

$^{31}$P-NMR (300 MHz, CDCl$_3$) δ=62.3 ppm.

Embodiment 11

Synthesis of BDBDA-DDP:

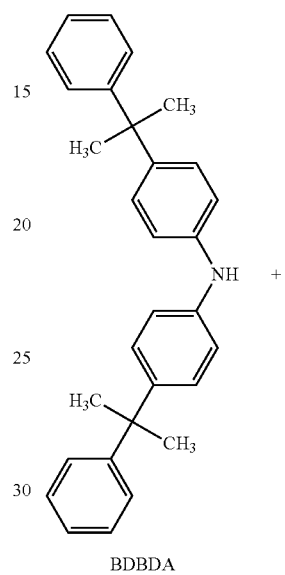

BDBDA

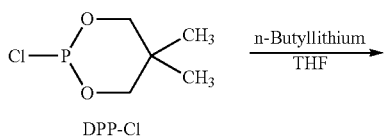

DPP-Cl

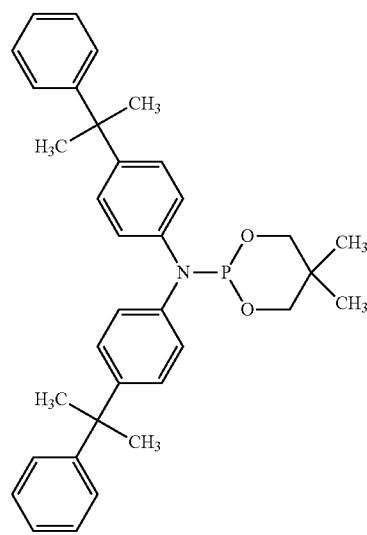

BDBDA-DDP 206.8 g 4,4'-bis(α,α-dimethylbenzyl)diphenylamine (BDBDA) was added into a carefully dried two-liter three-necked flask filled with argon that was equipped with a magnetic stirrer, a drip funnel, and an argon feed. Heating then took place for approximately 30 min. at approximately 0.02 mbar in an oil bath (85° C.). After the cooling to room temperature and the filling of the flask with nitrogen, 500 ml dry THF was added by means of a syringe. A colorless solution was produced. Approximately 323 ml of a 1.6 molar solution of n-butyl lithium in n-hexane was dripped (by means of a syringe) into it in the course of approximately 60 min while stirring. The flask was cooled using a water bath here. A yellow solution was produced that was stirred for 30 min.

Approximately 84.3 g of DDP-Cl was then dripped in by means of a syringe in the course of approximately 90 min while stirring (flask still in the water bath). In the course of the reagent addition, the yellow coloration became paler and after approximately two thirds of the DDP-Cl had been added, the reaction mixture became cloudy. 100 ml of dry n-hexane was then added while stirring to effect the precipitation of still dissolved LiCl. It was stirred for some minutes. The flask with the product solution was stored overnight at room temperature under nitrogen. The precipitated LiCl was removed by means of decanting under inert conditions. The greater part of the volatile elements of the solution was then distilled in a cold trap, with the pressure being slowly reduced to approximately 50 mbar and the temperature of the oil bath being raised to 60° C. A viscous oily residue was obtained that was further heated up to approximately 70° C. Approximately 800 ml acetonitrile was added thereto through a funnel.

The flask content was then heated to just below boiling point under a nitrogen atmosphere. A cloudiness remained that was deposited after the stopping of the stirrer. After the cooling of the flask content, decanting took place under inert conditions into a 2 L flask filled with nitrogen. The remaining residue was admixed with approximately 100 ml acetonitrile; it was heated and filtered through a paper filter (into the 2 liter flask with the decanted solution). Crystalline product from the combined product solution was precipitated at the flask wall during cooling. After approximately 2 h, when substantial amounts of the product had already crystallized, the flask was moved into a refrigerator and was stored overnight there.

The supernatant solution was then separated by means of decanting. The raw product thus obtained was recrystallized from 750 ml acetonitrile under a nitrogen atmosphere. The product was sucked off by means of a porcelain funnel/filter paper (air presence) and was subsequently dried in the 1 liter flask by means of vacuum of a membrane pump, with heating taking place carefully with a hair dryer and with stirring taking place frequently. A white powder was obtained (201 g). A further 10 g of the product were isolated from the residual solution of the recrystallization. The NMR spectroscopic examination of the product showed a purity of 99.5%.

$^{31}$P-NMR (300 MHz, CDCl$_3$) δ=121.0 ppm; $^1$H-NMR (300 MHz, CDCl$_3$) δ=7.10-7.33 (m, 18H, Ar), 3.53-3.56 (d, 4H, CH$_2$), 1.72 (s, 12H, H$_3$C—C—CH$_3$), 1.04 (s, 3H, CH$_3$), 0.61 (s, 3H, CH$_3$) ppm. $^{13}$C-NMR (300 MHz, CDCl3, chromo-acetyl acetonate) δ=140.0 (s, 2C), 146.2 (s, 2C), 142.7 (d, 2C), 128.0 (s, 4C), 127.4 (s, 4C), 126.8 (s, 4C), 125.6 (s, 2C), 124.8 (d, 4C), 72.0 (s, 2C), 42.6 (s, 2C), 32.3 (d, 1C), 30.8 (s, 4C), 22.4 (d, 2C) ppm.

Melting point [° C.]: 98-99° C.

Embodiment 12

Synthesis of BDBDA-DDPS:

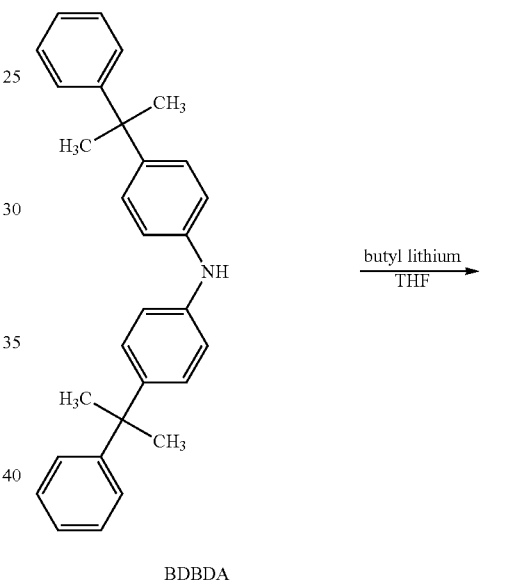

BDBDA

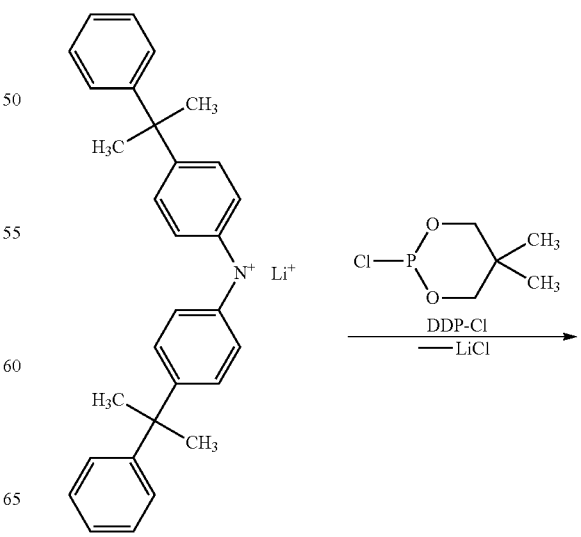

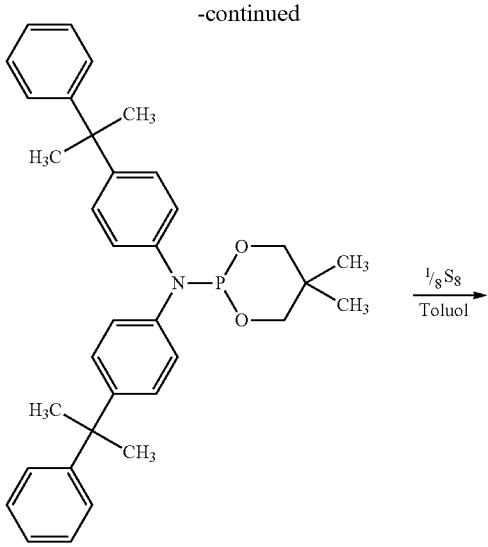

BDBDA-DDP

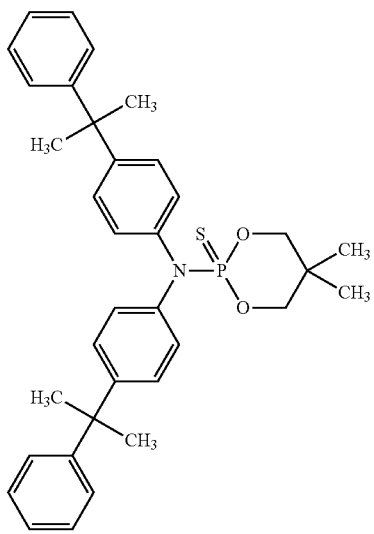

BDBDA-DDPS

The apparatus used was carefully dried.

BBDA (239.7 g) was presented, the apparatus was evacuated 3× and filled with nitrogen again to remove any adhering moisture. Subsequently, 440 ml dry THF was added by means of a syringe. A colorless solution was produced. 375 ml of a 1.6 molar butyl lithium solution in n-hexane was dropped into said colorless solution (by means of a syringe) while stirring in the course of approximately 70 min. The flask was cooled using a water bath here. A yellow solution was produced that was stirred for a further 30 min. 97.8 DDP-Cl was then dripped in by means of a syringe while stirring over the course of approximately 80 min (flask still in the water bath), with a pale yellow suspension being obtained. A $^{31}$P-NMR spectrum of this suspension was taken (CDCl$_3$) that showed a complete conversion of the DDP-Cl.

The reaction mixture was stored overnight at room temperature under nitrogen.

The precipitated LiCl was separated by decanting under inert conditions. The solution was here moved into a 2 L flask. 20 ml THF and 50 ml cyclohexane were added to the salt residue (to remove most of the product still included). Stirring then took place and the suspension was filtered through a paper filter (into the 2 L flask with the BDBDA-DDP solution). The combined solution was light brown and was subsequently subjected to the sulfurizing reaction.

The 2 liter flask was equipped with an inner thermometer. Approximately 20 g of sulfur was then added in four portions while stirring over the course of approximately 15 min, with the flask dipping into an oil bath. A considerable temperature increase up to approximately 45° C. was found. When the temperature had exceeded its maximum, the heating of the oil bath was begun that was heated to 57° over the course of 30 min. Stirring took place for a further 30 min at approximately 50-52° C. (inner temperature) and an NMS sample was then taken. The $^{31}$P-NMR spectrum of the product solution showed that the sulfurization had taken place with a very high selectivity.

The solution thus obtained was moved into a 2 liter one-neck flask. Rinsing took place using 40 ml warm THF since a small amount of the product had already crystallized at the base of the three-necked flask. Further product was precipitated at the base in the one-necked flask. To achieve a sufficiently complete crystallization of the product, approximately half of the solvent THF and n-hexane was distilled (water bath 40° C.) at the rotary evaporator. The pressure was lowered in small steps here. A significant portion of the product crystallized during the distillation. The closed flask was stored overnight in the refrigerator (approximately 5° C.).

The crystallized product was sucked off. A beige crystalline solid was obtained whose $^{31}$P-NMR spectrum and proton spectrum already show good purity (approximately 99 mol % purity in the phosphorous spectrum; the proton spectrum also hardly shows any contaminants). Approximately 230 g of the substance was obtained. The residual solution was washed with water to remove the remaining LiCl (the aqueous phase was brown and was discarded). It was then greatly concentrated in partial vacuum at the rotary evaporator, with a further product fraction being obtained. The further purification took place by recrystallization from acetonitrile and by drying in vacuum while carefully heating. A total of 256 g of pure BDBDA-DDPS was obtained as a white solid (77% of the theoretical amount).

$^{31}$P-NMR (300 MHz, CDCl$_3$) δ=64.1 ppm; $^1$H-NMR (300 MHz, CDCl$_3$) δ=7.15-7.35 (m, 18H, Ar), 4.28-4.6 (q, 2H, CH$_2$), 3.69-3.82 (q, 2H, CH$_2$), 1.68 (s, 12H, H$_3$C—C—CH$_3$), 0.87 (s, 3H, CH$_3$), 0.67 (s, 3H, CH$_3$) ppm.

Melting point [° C.]: 133-135

Embodiment 13

Synthesis of BDBDA-DDP from PCI3, BDBDA and 1,3-dimethylpropane-1,3-diol:

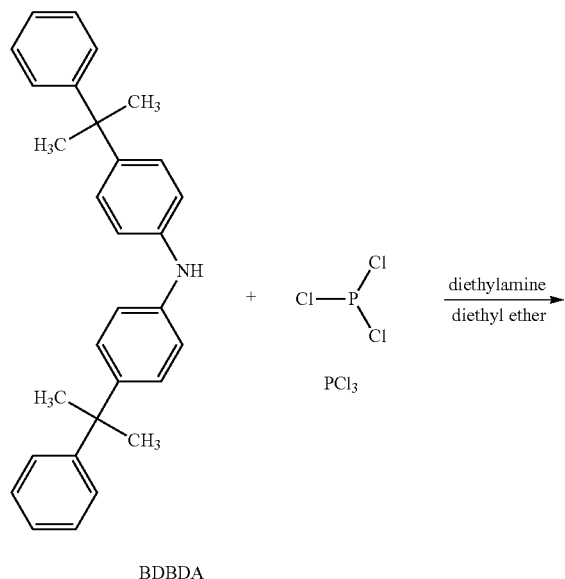

BDBDA

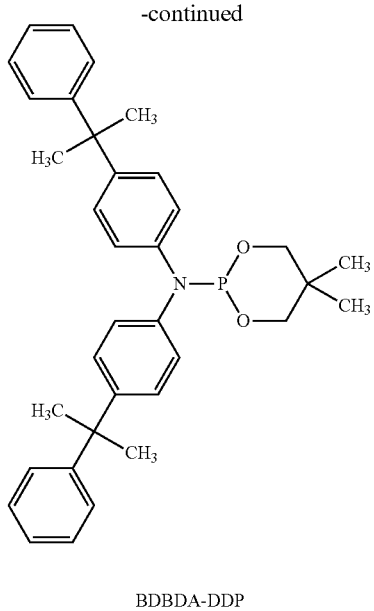

BDBDA-DDP

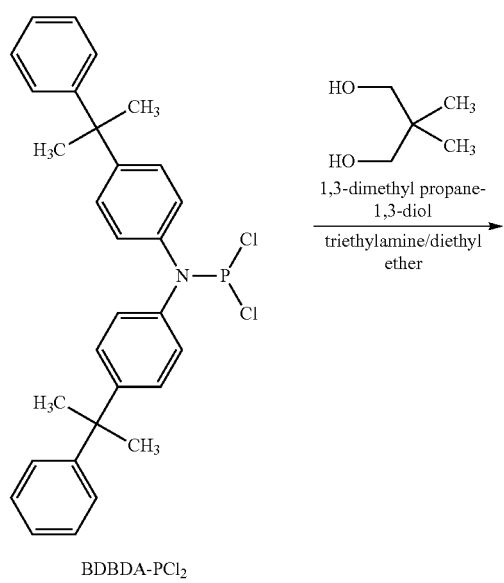

BDBDA-PCl2

The apparatus used was carefully dried. The synthesis was carried out under a nitrogen atmosphere.

BDBDA (11.4 g) was presented, the apparatus was then evacuated three times and filled with nitrogen again to remove any moisture adhering to the BDBDA powder. Subsequently, 100 ml absolute diethyl ether was added by means of a syringe. The solution thus obtained was cooled to approximately 10° C. 2.8 g triethylamine and 3.84 g phosphorous trichloride were then added after one another while stirring, with a colorless solid being precipitated (triethyl ammonium chloride). Stirring took place for a further three hours at room temperature. The triethyl ammonium chloride was then filtered off under inert conditions. The solution was subsequently concentrated in partial vacuum. A $^{31}$P-NMR spectrum was taken that only contained the phosphorous signal of BDBDA-PCl$_2$ (300 MHz, CDCl$_3$, δ=148.8 ppm).

6 g triethyl amine and 6 g 1,3-dimethyl propane-1,3-diol were then added. Once the reaction mixture had been stirred for two hours at room temperature, 50 ml diethyl ether was added. The precipitated triethyl ammonium chloride was then filtered off and the solvent was distilled off. The remaining residue was recrystallized from acetone nitrile.

The yield of spectroscopically pure BDBDA-DDP amounted to 10.9 g (72% of the theoretical amount, related to BDBDA).

$^{31}$P-NMR (300 MHz, CDCl$_3$) δ=121.0 ppm; $^1$H-NMR (300 MHz, CDCl$_3$) δ=7.10-7.33 (m, 18H, Ar), 3.53-3.56 (d, 4H, CH$_2$), 1.72 (s, 12H, H$_3$C—C—CH$_3$), 1.04 (s, 3H, CH$_3$), 0.61 (s, 3H, CH$_3$) ppm.

Embodiment 14

Synthesis of PhP(BDBDA)2

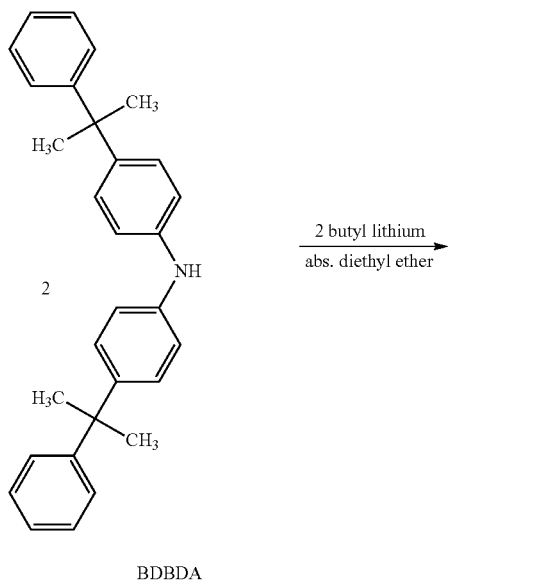

BDBDA

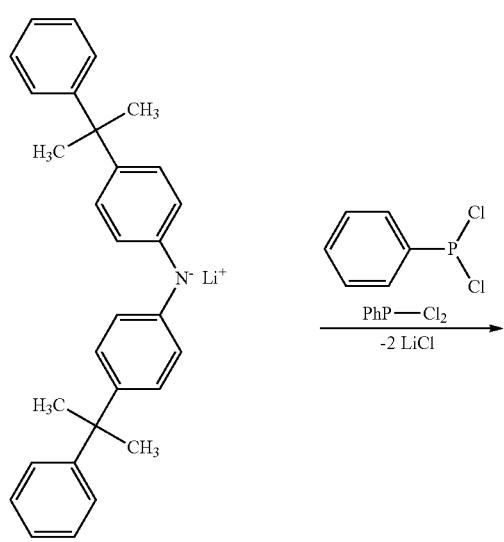

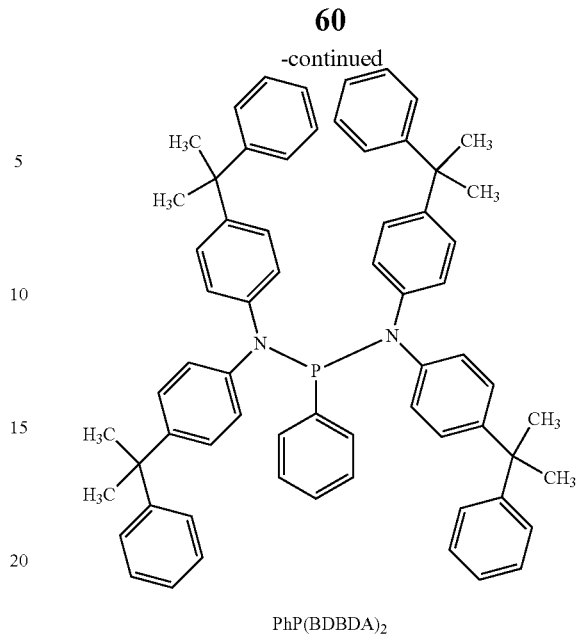

PhP(BDBDA)$_2$

The apparatus used was carefully dried. The synthesis was carried out under a nitrogen atmosphere.

BDBDA (116.4 g) was presented, the apparatus was them evacuated 3 times and filled with nitrogen again to remove any adhering moisture. Subsequently, 750 ml absolute diethyl ether was added by means of a syringe. A colorless solution was produced. 171.3 ml of a 1.6 molar butyl lithium solution in n-hexane was dripped into it by means of a syringe over the course of an hour while stirring and cooling by an ice water bath. A pale yellow solution of the lithium salt of BDBDA was produced. Stirring was continued for 45 min and then 24.52 g PhP—Cl$_2$ was dripped into the still cooled solution by means of a syringe over the course of 20 min while stirring. A cloudiness was first produced due to the precipitation of LiCl. A very large amount of product precipitated at the end of the reagent addition. Stirring was continued for a further hour at a moderate stirring speed. A $^{31}$P-NMR spectrum of this suspension was taken (CDCl$_3$) that showed a complete conversion of the PhP—Cl$_2$ and very selective product formation.

The main portion of the volatile components was then distilled in a weak vacuum into a sample cooled by liquid nitrogen (the flask dipped into a water bath of approximately 20° C.). Stirring was no longer possible at the end of the distillation. Finally, a greater vacuum was briefly applied. 500 ml absolute toluol was added to the residue obtained (peak). Heating then took place up to approximately 65° C. while carefully stirring, with the product dissolving and only the LiCl remaining undissolved that was filtered off under inert conditions. The toluol was now distilled in a part vacuum in a sample cooled by liquid nitrogen (the flask dipped into an oil bath of initially approximately 55° C.; at the end of the distillation, the oil bath temperature was increased to approximately 75° C.). The residue solidified when the toluol had been almost completely distilled. The solid thus obtained was stirred for one hour with 1 liter of acetonitrile with backflow and a nitrogen atmosphere. The product was sucked off (in the presence of air) by means of a porcelain funnel/filter paper. A white crystalline filter cake was obtained that was dried in vacuum with moderate heating. The yield of PhP(BDBDA)2 amounts to 112 g (approximately 89% of the theoretically possible amount).

$^{31}$P-NMR (300 MHz, CDCl$_3$) δ=86.0 ppm; $^1$H NMR (300 MHz, CDCl$_3$) δ=7.10-7.33 (m, 25H, Ar), 6.97-7.5 (d, 8H, Ar), 6.78-6.84 (d, 8H, Ar), 1.66 (s; 24H, H$_3$C—C—CH$_3$) ppm.

Melting point [° C.]: 116-118

Investigations of the Stabilizer Effect in Polypropylene:

The trials on the stabilizer effect with propylene were carried out at 230° C. in a twin screw microextruder. Polypropylene of the type MOPLEN HP556E and MOPLEN HP500N (products of Lyondell Basell Industries) was used that had previously been comminuted by means of a centrifugal mill at 10,000 r.p.m. and had been dried for approximately 5 h at 100° C. in a vacuum drying cabinet (20 mbar). Three respective extrusion trials were carried out for each polymer additive mixture. The total amount of the polymer-additive mixture used in each individual trial amounted to 4 g. The forces in each run were recorded by means of software at intervals of one second.

The additives used, their concentrations, and the forces acting at different extrusion times are recorded in Tables 1 and 2 (in each case as average values of three individual trials). For comparison, extrusions were also carried out using the established stabilizer system ADK-STAB A611/Caesit AV and pure MOPLEN HP556E and MOPLEN HP5 was tested.

TABLE 1

(Trials with MOPLEN HP 556E)

| Additive | Force after 30 s (N) | Force after 60 s (N) | Force after 120 s (N) | Force after 180 s (N) | Force after 300 s (N) | Force after 600 s (N) |
|---|---|---|---|---|---|---|
| — | 1830 | 1760 | 1660 | 1590 | 1430 | 1260 |
| ADK-STAB A611 0.2% Caesit AV$^{e)}$ 0.1% | 1800 | 1820 | 1720 | 1660 | 1540 | 1270 |
| Phenothiazine-DOP 0.2% | 2040 | 2030 | 1940 | 1960 | 1990 | 1930 |
| Phenothiazine-DOP 0.5% | 1980 | 1990 | 2000 | 1990 | 2010 | 1970 |
| Phenothiazine-DOP 1.0% | 2000 | 2010 | 1970 | 1980 | 1990 | 2050 |
| Phenothiazine-DOPS 0.5% | 2000 | 2040 | 1990 | 2060 | 2020 | 2010 |
| Phenothiazine-DOPS 1.0% | 2020 | 2000 | 1970 | 1920 | 1930 | 2010 |

TABLE 2

(Trials with MOPLEN HP 500N)

| Additive | Force after 30 s (N) | Force after 60 s (N) | Force after 120 s (N) | Force after 180 s (N) | Force after 300 s (N) | Force after 600 s (N) |
|---|---|---|---|---|---|---|
| — | 550 | 530 | 510 | 480 | 460 | 450 |
| Ceasit 0.2% | 640 | 600 | 580 | 560 | 540 | 520 |
| ADK-STAB A611 0.2% | 610 | 570 | 560 | 540 | 520 | 530 |
| PhP(BDBDA)2 0.2% Ceasit AV 0.2% | 730 | 730 | 750 | 740 | 740 | 730 |
| BDBDA-DDP 0.2% | 600 | 600 | 610 | 600 | 590 | 580 |

Multiple Extrusions

Polypropylene of the type Moplen HP556E LOI 033L30 from LyondellBasell was used for the extrusions. The trials were carried out on a twin screw extruder Thermo Scientific Process 11 with a screw diameter of 11 mm.

A total of 350 g of pure polypropylene, polypropylene, and polypropylene having an additive of 0.3% phenothiazine_DOPS (PTZ_DOPS) was respectively extruded three times in a twin screw extruder. The sample was dried for approximately 1 h in the vacuum drying cabinet at 60° C. after every extrusion. 50 g were subsequently kept behind and the remaining granulate was extruded again. The temperature profile used is Table 3; the parameters obtained in each extrusion can be seen from Table 4 to Table 6.

TABLE 3

Temperature profile used in the extrusions on the twin screw extruder.

| Nozzle | Zone 7 | Zone 6 | Zone 5 | Zone 4 | Zone 3 | Zone 2 |
|---|---|---|---|---|---|---|
| 210 | 230 | 230 | 230 | 230 | 220 | 210 |

TABLE 4

Parameters of the three extrusions of pure polypropylene

|  | 1st extrusion | 2nd extrusion | 3rd extrusion |
|---|---|---|---|
| Speed/r.p.m. | 150 | 150 | 150 |
| Throughput/g/h | 456 | 516 | 552 |
| Melting temperature/° C. | 216-217 | 215-217 | 215-216 |
| Melting pressure/bar | 26-28 | 30-33 | 31-33 |
| Torque/% | 27-29 | 35-39 | 36-41 |
| Torque/Nm | 3.1-3.3 | 4.2-4.6 | 4.4-5.0 |
| Torque/kW | 0.04-0.05 | 0.06-0.07 | 0.06-0.07 |

TABLE 5

Parameters of the three extrusions of polypropylene with an additive of 0.3% phenothiazine-DOPS.

| Pure PP | 1st extrusion | 2nd extrusion | 3rd extrusion |
|---|---|---|---|
| Speed/r.p.m. | 150 | 150 | 150 |
| Throughput/g/h | 468 | 576 | 552 |
| Melting temperature/° C. | 213-215 | 214-217 | 214-217 |
| Melting pressure/bar | 27-29 | 32-33 | 30-32 |
| Torque/% | 28-30 | 37-40 | 33-37 |
| Torque/Nm | 3.4-3.6 | 4.4-4.8 | 3.9-4.4 |
| Torque/kW | 0.05 | 0.06-0.07 | 0.06-0.07 |

Melt flow measurements were subsequently carried put with all samples obtained that had previously been dried overnight in the vacuum drying cabinet at approximately 60° C. A respective 3.5 g of the sample was measured for this purpose at 230° C. and at a weight of 2.16 kg (DIN EN ISO 19069). The measurement of each sample took place two to three times here and the results were subsequently averaged. The MVR of the pure polymer should be 1.10 cm$^3$/10 min here according to the manufacturer's specifications. Table 5 shows the results of these measurements.

TABLE 6

List of averaged MVR values of the respective three extrusions of pure polypropylene and of propylene having an additive of 0.3% phenothiazine_DOPS.

| Sample | MVR/ccm/10 min |
|---|---|
| Pure PP (granulate, not extruded) | 1.1294 |
| 1st extrusion of pure PP | 1.2120 |
| 2nd extrusion of pure PP | 1.3073 |
| 3rd extrusion of pure PP | 1.3714 |
| 1st extrusion of PP having 0.3% PTZ_DOPS | 1.1311 |
| 2nd extrusion of PP having 0.3% PTZ_DOPS | 1.1179 |
| 3rd extrusion of PP having 0.3% PTZ_DOPS | 1.1524 |

The comparison of the results of Table 5 shows the very good stabilization effect of the stabilizers in accordance with the invention since, unlike pure PP, there no, or only small, molecular weight reduction (=higher MVR) takes place.

Stabilizer Effect of the Substances in Accordance with the Invention:

The phosphorous phenothiazine derivatives in accordance with the invention were tested with respect to their effect as processing stabilizers. How the new additives influence the melting viscosity of polypropylene during the extrusion process (230° C.) was examined. The force in the extruder was measured in dependence on time in the trials. The measured force is proportional to the active torque and the latter depends directly on the melting viscosity. A reduction of the measured force thus indicates a polymer degradation during the extrusion process. The established stabilizer system ADK-STAB A611 (0.2%)/Caesit AV (0.1%) was tested for comparison. Comparison trials using pure propylene were likewise carried out.

As was to be expected, a continuous reduction in force was determined during the extrusion process with pure polypropylene. After 10 min, the measured force was only approximately two thirds of the value measured after 30 s. On use of the established stabilizer mixture, the force initially remained constant, as was to be expected, but it already dropped considerably after 3 min extrusion time and, as with pure PP, fell to approximately two thirds of the starting value after a dwell time of 10 min. This means that the comparison system already loses its effect after a relatively short extrusion time.

Surprisingly no change in the force was found during extrusion with polypropylene to which small amounts of the stabilizers in accordance with the invention had been added. Even after a long dwell time in the extruder (e.g. 10 min!), no drop in force took place while the comparison system had long since lost its effect (great fall in the measured force).

The stabilizers in accordance with the invention thus showed an exceptional effectiveness that was a lot higher in comparison with the comparison system.

The trials showed that when the stabilizers in accordance with the invention are used, a processing of the polypropylene in the melt (extrusion, injection molding, etc.) is possible without degradation processes.

The primary or secondary antioxidant can here be worked into the organic material in the same way as the compound in accordance with the general formula I.

Primary antioxidants act via a radical mechanism with a chain-breaking effect. Secondary antioxidants have a stabilizing effect that is based on an ionic mechanism and act as hydroperoxide decomposers. A combination of both groups can be used to achieve synergetic effects.

We claim:

1. A method of stabilizing an organic material comprising working into the organic material one or more compounds in accordance with general formula I, $$A\text{-}B_y,\qquad \text{Formula I,}$$

wherein A is:

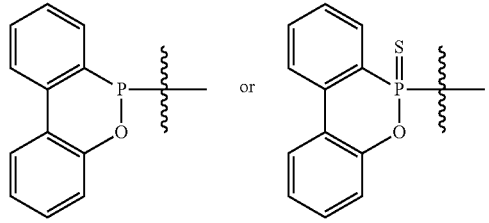 [SMILES: *P1Oc2ccccc2-c2ccccc21 ; *P1(=S)Oc2ccccc2-c2ccccc21]

and y=1, or
wherein A is:

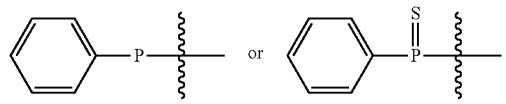

and y=2, or
wherein A is:

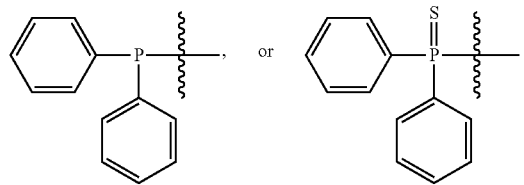

and y=1,
and B is:

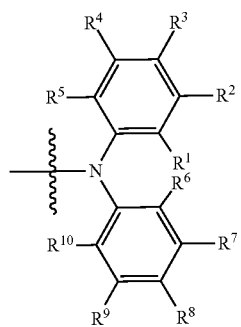

wherein, respectively independently of one another, $R^1$ to $R^{10}$ are selected from hydrogen, alkyl residues, aryl residues, alky aryl residues, aryl alkyl residues, and heterocyclic residues.

2. The method of claim 1, wherein the organic material is selected from plastics, coatings, lubricants, hydraulic oils, engine oils, turbine oils, transmission oils, metal machining liquids, chemicals, and monomers.

3. The method of claim 1, wherein the compound or mixture of compounds of formula I is included in the organic material at a weight proportion of 0.01 to 10 wt. %.

4. The method of claim 1, wherein the plastic is selected from
   a) polymers of olefins or diolefins, polyalkylene carbon monoxide copolymers, and copolymers in the form of static structures or block structures, graft polymers, and blends thereof,
   b) polystyrene, polymethylstyrene, poly-alpha-methyl styrene, polyvinyl naphthalene, polyvinyl biphenyl, polyvinyl toluol, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile (SAN), styrene acrylonitrile acrylate (ASA), styrene ethylene, styrene maleic acid anhydride polymers, corresponding graft copolymers, and graft copolymers of methylmethacrylate, styrene butadiene, and ABS (MABS), and hydrated polystyrene derivatives,
   c) halogen-containing polymers, copolymers of vinyl chloride and vinylidene chloride or of vinyl chloride and vinyl acetate, chlorinated polyethylene, polyvinylidene fluoride, epichlorohydrin homopolymers and copolymers thereof,
   d) polymers of unsaturated esters, polyacrylonitrile, polyacrylamides, and polyacrylonitrile-poly alkyl acrylate,
   e) polymers of unsaturated alcohols and derivatives,
   f) polyacetates,
   g) polyphenylene oxides and blends with polystyrene or polyamides,
   h) polymers of cyclic ethers,
   i) polyurethanes of hydroxy terminated polyethers or polyesters and aromatic or aliphatic isocyanates,
   j) polyamides, blends of and blends of polyamides and polyolefins,
   k) polyimides, polyamide imides, polyether imides, polyester imides, poly(ether)ketones, polysulfones, polyether sulfones, polyaryl sulfones, polyphenylene sulfides, polybenzimidazoles, polyhydantoins,
   l) polyesters of aliphatic or aromatic dicarboxylic acids and diols or of hydroxy carboxylic acids,
   m) polycarbonates, polyester carbonates, and blends,
   n) cellulose derivatives,
   o) epoxy resins comprising difunctional or polyfunctional epoxy compounds, optionally in combination with hardeners,
   p) phenol resins, urea formaldehyde resins, melamine formaldehyde resins,
   q) unsaturated polyester resins of unsaturated dicarboxylic acids and diols with vinyl compounds,
   r) silicones,
   s) and mixtures, combinations, or blends of two or more of the above-named polymers.

5. The method of claim 1, wherein the plastic is selected from
   a) polyethylene, polypropylene, polyisobutylene, poly-4-methyl-pentene-1, polybutadiene, polyisoprene, polycyclooctene, polyalkylene carbon monoxide copolymers, polypropylene-polyethylene copolymers (EP), EPM copolymer, EPDM copolymer, ethylene-vinyl acetate (EVA), ethylene-acrylic ester, ethylene-acrylic acid and their salts, ethylene-acrylic acid-glycidyl (meth)acrylate, polypropylene graft maleic acid anhydride, polypropylene graft acrylic acid, polyethylene graft acrylic acid, polyethylene polybutylacrylate graft maleic acid anhydride, and blends thereof,
b) polystyrene, polymethylstyrene, poly-alpha-methyl styrene, polyvinyl naphthalene, polyvinyl biphenyl, polyvinyl toluol, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile (SAN), styrene acrylonitrile acrylate (ASA), styrene ethylene, styrene maleic acid anhydride polymers, graft copolymers of styrene on butadiene, graft copolymers of maleic acid anhydride on SBS or SEBS, and graft copolymers of methylmethacrylate, styrene butadiene, and ABS (MABS), and hydrated polystyrene derivatives,
c) polyvinyl chloride (PVC), polychloroprene, polyvinylidene chloride (PVDCl), copolymers of vinyl chloride and vinylidene chloride, copolymers of vinyl chloride and vinyl acetate, chlorinated polyethylene, polyvinylidene fluoride, epichlorohydrin homopolymers and copolymers thereof,
d) polymethyl methacrylate (PMMA), polybutyl acrylate, polylauryl acrylate, polystearyl acrylate, polyglycidyl acrylate, polyglycidyl methacrylate, polyacrylonitrile, polyacrylamides, and polyacrylonitrile-poly alkyl acrylate copolymers,
e) polyvinyl alcohol, polyvinyl acetate, polyvinyl butyral, polyallyl phthalate, and polyallyl melamine,
f) polyoxymethlyene (POM) or copolymers with butanal,
g) polyphenylene oxides and blends with polystyrene or polyamides,
h) polyethylene glycol, polypropylene glycol, polyethylene oxide, polypropylene oxide, or polytetrahydrofuran,
i) linear polyurethanes (TPU) and polyureas,
j) polyamide-6, 6.6, 6.10, 4.6, 4.10, 6.12, 10.10, 10.12, 12.12, polyamide 11, polyamide 12 and (partly) aromatic polyamides such as polyphthalamides, blends of PA-6 and PA 6.6 and blends of polyamides and blends of PA/PP,
k) polyimides, polyamide imides, polyether imides, polyester imides, poly(ether)ketones, polysulfones, polyether sulfones, polyaryl sulfones, polyphenylene sulfides, polybenzimidazoles, or polyhydantoins,
l) polyethylene terephthalate (PET), polybutylene terephthalate (PBT), polypropylene terephthalate (PTT), polyethylene naphthalate (PEN), poly-1,4-dimethylol cyclohexane terephthalate, polyhydroxy benzoate, polyhydroxy napththalate, poly lactic acid (PLA), polyhydroxy butyrate (PHB), polyhydroxy valerate (PHV), polyethylene succinate, polytetramethylene succinate, or polycaprolactone,
m) polycarbonates, polyester carbonates, PC/ABS, PC/PBT, PC/PET/PBT, or PC/PA blends,
n) cellulose nitrate, cellulose acetate, cellulose propionate, or cellulose butyrate,
o) epoxy resins comprising difunctional or polyfunctional epoxy compounds in combination with a hardener based on amines, anhydrides, dicyandiamide, mercaptans, isocyanates or catalytically acting hardeners,
p) phenol formaldehyde resins, urea formaldehyde resins, or melamine formaldehyde resins,
q) unsaturated polyester resins of unsaturated dicarboxylic acids and diols with vinyl compounds,
r) silicones,
s) and mixtures, combinations, or blends of two or more of the above-named polymers.

6. The method of claim 1, which includes adding at least one further additive selected from the group consisting of UV absorbers, light stabilizers, hydroxylamine based stabilizers, benzofuranone based stabilizers, nucleation agents, toughening agents, plasticizers, mold lubricants, rheology modifiers, chain extenders, processing aids, pigments, dyestuffs, optical brighteners, antimicrobial agents, antistatic agents, slip agents, anti-blocking agents, coupling agents, dispersing agents, compatibilizers, oxygen scavengers, acid scavengers, marking agents, and anti-fogging agents.

7. The method of claim 1, which includes adding at least one further primary and/or secondary antioxidant selected from phenolic antioxidants, phosphites, phosphonites, amines, hydroxylamines, and mixtures and combinations.

\* \* \* \* \*